(12) United States Patent
Turcan et al.

(10) Patent No.: US 8,149,823 B2
(45) Date of Patent: Apr. 3, 2012

(54) COMPUTER TELEPHONY INTEGRATION (CTI) SYSTEMS AND METHODS FOR ENHANCING SCHOOL SAFETY

(75) Inventors: Diane Brown Turcan, Smyrna, GA (US); David L. Wellons, Marietta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1648 days.

(21) Appl. No.: 10/351,684

(22) Filed: Jan. 27, 2003

(65) Prior Publication Data

US 2004/0146047 A1  Jul. 29, 2004

(51) Int. Cl.
  *H04L 12/16* (2006.01)
  *H04L 12/66* (2006.01)
  *H04H 20/71* (2008.01)
  *H04M 3/00* (2006.01)

(52) U.S. Cl. ... 370/356; 370/262; 370/312; 379/265.02; 379/258

(58) Field of Classification Search ........... 370/328, 370/260–262, 270, 312, 352–356, 401, 466–467; 379/365.02, 265.01–265.03, 265.11–265.14, 379/266.01–266.04, 258, 262, 387.01, 265.05, 379/265.1
See application file for complete search history.

(56) References Cited

U.S. PATENT DOCUMENTS

| | | | |
|---|---|---|---|
| 4,817,130 A | 3/1989 | Frimmel, Jr. | |
| 4,979,206 A | 12/1990 | Padden et al. | |
| 5,062,103 A | 10/1991 | Davidson et al. | |
| 5,062,133 A | 10/1991 | Melrose | |
| 5,113,429 A | 5/1992 | Morley, Jr. et al. | |
| 5,278,955 A | 1/1994 | Forte et al. | |
| 5,283,856 A | 2/1994 | Gross et al. | |
| 5,418,628 A | 5/1995 | Perkins | |
| 5,651,058 A | 7/1997 | Hackett-Jones et al. | |
| 5,678,179 A | 10/1997 | Turcotte et al. | |
| 5,711,297 A | 1/1998 | Iliff | |
| 5,748,100 A | 5/1998 | Gutman et al. | |
| 5,764,731 A * | 6/1998 | Yablon | 379/88.15 |
| 5,815,566 A | 9/1998 | Ramot et al. | |
| 5,822,418 A * | 10/1998 | Yacenda et al. | 379/201.07 |
| 5,841,854 A | 11/1998 | Schumacher et al. | |
| 5,868,669 A | 2/1999 | Iliff | |
| 5,878,130 A | 3/1999 | Andrews et al. | |
| 5,915,010 A * | 6/1999 | McCalmont | 379/212.01 |
| 5,917,893 A | 6/1999 | Katz | |
| 5,924,074 A | 7/1999 | Evans | |
| 5,940,740 A | 8/1999 | Aas et al. | |
| 5,963,864 A | 10/1999 | O'Neil | |
| 6,011,844 A | 1/2000 | Uppaluru et al. | |

(Continued)

OTHER PUBLICATIONS

MediCall™ The Complete Call Center Solution for the Healthcare Industry, XTEND, 171 Madison Avenue, New York, NY 10016 212. 951.7681, www.xtend.com.

(Continued)

*Primary Examiner* — Aung S Moe
*Assistant Examiner* — Redentor Pasia
(74) *Attorney, Agent, or Firm* — Scott P. Zimmerman PLLC

(57) ABSTRACT

Methods and systems are disclosed for enabling a dynamic computer telephony integration campus call center that leverages the assets of a school communications system including internal telecommunications networks, information systems, data networks, and applications, of public telecommunications networks, of public data networks, and/or of various communications devices to facilitate improved access, sharing, notification, and/or management of communications (e.g., external and internal communications) and associated data to enhance school safety services.

7 Claims, 18 Drawing Sheets

U.S. PATENT DOCUMENTS

| | | | |
|---|---|---|---|
| 6,035,021 A | 3/2000 | Katz | |
| 6,052,442 A | 4/2000 | Cooper et al. | |
| 6,119,108 A | 9/2000 | Holmes et al. | |
| 6,122,485 A | 9/2000 | Archer | |
| 6,137,524 A | 10/2000 | Chea | |
| 6,137,876 A | 10/2000 | Wong et al. | |
| 6,151,586 A | 11/2000 | Brown | |
| 6,185,603 B1 | 2/2001 | Henderson et al. | |
| 6,201,804 B1 | 3/2001 | Kikinis | |
| 6,206,829 B1 | 3/2001 | Iliff | |
| 6,229,888 B1 | 5/2001 | Miloslavsky | |
| 6,295,551 B1 | 9/2001 | Roberts et al. | |
| 6,305,007 B1 | 10/2001 | Mintz | |
| 6,310,543 B1 | 10/2001 | Yoshioka et al. | |
| 6,324,279 B1 * | 11/2001 | Kalmanek et al. | 379/229 |
| 6,339,593 B1 | 1/2002 | Kikinis | |
| 6,366,658 B1 * | 4/2002 | Bjornberg et al. | 379/221.08 |
| 6,408,068 B1 * | 6/2002 | Larson et al. | 379/357.01 |
| 6,434,121 B1 | 8/2002 | Davidson et al. | |
| 6,445,784 B2 | 9/2002 | Uppaluru et al. | |
| 6,456,594 B1 | 9/2002 | Kaplan et al. | |
| 6,462,656 B2 | 10/2002 | Ulrich et al. | |
| 6,473,404 B1 | 10/2002 | Kaplan et al. | |
| 6,482,156 B2 | 11/2002 | Iliff | |
| 6,501,562 B1 | 12/2002 | Nakagiri et al. | |
| 6,532,489 B1 | 3/2003 | Merchant | |
| 6,611,590 B1 * | 8/2003 | Lu et al. | 379/265.09 |
| 6,633,848 B1 * | 10/2003 | Johnson et al. | 704/277 |
| 6,721,412 B1 | 4/2004 | Youngs | |
| 6,771,173 B1 | 8/2004 | Clayton et al. | |
| 6,785,380 B2 * | 8/2004 | Ribera | 379/265.09 |
| 6,810,429 B1 | 10/2004 | Walsh et al. | |
| 6,859,649 B1 | 2/2005 | Denenberg et al. | |
| 6,888,927 B1 * | 5/2005 | Cruickshank et al. | 379/88.11 |
| 6,892,083 B2 * | 5/2005 | Shostak | 455/575.6 |
| 6,898,625 B2 | 5/2005 | Henry et al. | |
| 6,970,548 B2 * | 11/2005 | Pines et al. | 379/218.01 |
| 7,023,979 B1 * | 4/2006 | Wu et al. | 379/265.11 |
| 7,167,553 B2 * | 1/2007 | Shaffer et al. | 379/219 |
| 7,327,756 B2 | 2/2008 | Hamlin | |
| 2002/0004727 A1 | 1/2002 | Knaus et al. | |
| 2002/0010679 A1 | 1/2002 | Felsher | |
| 2002/0016818 A1 | 2/2002 | Kirani et al. | |
| 2002/0055917 A1 | 5/2002 | Muraca | |
| 2002/0055967 A1 | 5/2002 | Coussement | |
| 2002/0068575 A1 | 6/2002 | Agrawal et al. | |
| 2002/0076026 A1 | 6/2002 | Batten | |
| 2002/0080416 A1 | 6/2002 | Quine | |
| 2002/0106071 A1 | 8/2002 | Uppaluru et al. | |
| 2002/0112008 A1 | 8/2002 | Christenson et al. | |
| 2002/0114278 A1 * | 8/2002 | Coussement | 370/235 |
| 2002/0120687 A1 | 8/2002 | Diacakis et al. | |
| 2002/0143876 A1 | 10/2002 | Boyer et al. | |
| 2002/0144154 A1 | 10/2002 | Tomkow | |
| 2002/0163572 A1 | 11/2002 | Center, Jr. et al. | |
| 2002/0167935 A1 | 11/2002 | Nabkel et al. | |
| 2002/0188689 A1 | 12/2002 | Michael | |
| 2003/0009530 A1 | 1/2003 | Philonenko et al. | |
| 2003/0028399 A1 | 2/2003 | Davis et al. | |
| 2003/0055684 A1 | 3/2003 | Jaskolski et al. | |
| 2003/0058838 A1 | 3/2003 | Wengrovitz | |
| 2003/0065738 A1 | 4/2003 | Yang et al. | |
| 2003/0135565 A1 | 7/2003 | Estrada | |
| 2003/0135624 A1 | 7/2003 | McKinnon et al. | |
| 2003/0191665 A1 | 10/2003 | Fitzgerald et al. | |
| 2003/0191685 A1 | 10/2003 | Reese | |
| 2003/0200226 A1 | 10/2003 | Wells et al. | |
| 2003/0208543 A1 | 11/2003 | Enete et al. | |
| 2004/0057569 A1 | 3/2004 | Busey et al. | |
| 2004/0059603 A1 | 3/2004 | Brown, Jr. et al. | |
| 2004/0117215 A1 | 6/2004 | Marchosky | |
| 2004/0125938 A1 * | 7/2004 | Turcan et al. | 379/265.02 |
| 2004/0153511 A1 | 8/2004 | Maynard et al. | |
| 2004/0193449 A1 | 9/2004 | Wildman et al. | |
| 2004/0249776 A1 | 12/2004 | Horvitz et al. | |
| 2005/0035862 A1 | 2/2005 | Wildman et al. | |
| 2005/0065817 A1 | 3/2005 | Mihai et al. | |
| 2005/0154792 A1 | 7/2005 | Derygin et al. | |
| 2005/0209891 A1 | 9/2005 | Jacobus et al. | |

OTHER PUBLICATIONS

Paging Gateway A Wireless communications Solutions for Any Industry, XTEND, 171 Madison Avenue, New York, NY 10016 212.951.7681, www.xtend.com.

XPress Desk™ The Complete Call Center Solution for the Hotel Industry, XTEND, 171 Madison Avenue, New York, NY 10016 212.951.7681, www.xtend.com.

BellSouth Call Logix, BellSouth Corporation Headquarters, 1155 Peachtree St. NE, Atlanta, GA 30309-3610, www.bellsouth.com.

Please note that copies of the citations were filed with applicants' cross-referenced co-pending U.S. Appl. No. 10/335,113, entitled "Computer Telephony Integration (CTI) Complete Customer Contact Center," filed Dec. 31, 2002.

* cited by examiner

COMPUTER TELEPHONY INTEGRATION (CTI) SYSTEMS AND METHODS FOR ENHANCING SCHOOL SAFETY

CROSS REFERENCE TO RELATED APPLICATIONS

This application relates to applicants' co-pending U.S. patent application Ser. No. 10/335,113 entitled "Computer Telephony Integration (CTI) Complete Customer Contact Center," filed Dec. 31, 2002, and of which the "Brief Summary of the Invention" and "Detailed Description of the Invention" sections are incorporated herein by this reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to computer networks and to telephony. More particularly, this invention is directed to methods and systems for more efficient and effective communication and processing of communications and other electronic data within a school's call management and contact center.

2. Description of the Related Art

School safety is an issue that concerns all of us. Our children's well being and knowing that they are being taught in a safe and protective environment is important. Now more than ever, we are constantly reminded that schools throughout the country are plagued with the threats of violence, drugs, theft, vandalism, and other crimes. This epidemic is not limited to any particular geographic or socioeconomic area—it surrounds us all.

For the most part, schools have rarely understood or had time or resources to consider their security plans from a systems perspective (e.g., looking at the big picture). See U.S. Department of Justice Office of Justice Programs, The Appropriate and Effective Use of Security Technologies in U.S. Schools—A Guide for Schools and Law Enforcement Agencies, September 1999, NCJ 178265, (810 Seventh Street N.W., Washington, D.C. 20531, www.ncjrs.org/school/state.html). For each school, the security staff must define what shall be protected (e.g., people, assets, etc.), against whom shall it protect (e.g., the security risks, threats, etc.), and the constraints of that protection (e.g., facilities, building layout, funding/costs, politics, etc.). Using these considerations, the security staff can develop an effective and efficient security strategy. This strategy will likely include combinations of technologies, personnel, and procedures that do the best job of solving the problems within its constraints. Paramount to each school's solution is the ability to access and communicate school safety and security information.

Communications, including the ability to disseminate safety and security information, is vital to ensuring school safety and security. For example, if there is a bomb threat to the school, then the school must be able to communicate this threat to the students, teachers, and other occupants of the facilities, local law enforcement personnel, and other emergency response personnel. Thus, communicating threats or other safety information to appropriate personnel is vital to responding to and controlling safety and security risks.

Typically, each school has a call management and contact center (herein after referred to as a "call center") that is responsible for managing communications (including incoming, internal, and outgoing communications) and for disseminating communications to staff, students, and other individuals visiting the campus. These call centers are staffed with personnel, interactive voice response recordings, and/or information systems to process communications (e.g., a call from a parent to talk with a teacher, a call from a supplier for an address and/or directions to the campus, etc.). Each week, hundreds, if not more, of incoming communications (e.g., calls, emails, etc.) and associated data (e.g., identification of the incoming calling number and/or a name of the calling party) are received, accessed, and/or managed by the call center. Frequently, a person answering (hereinafter referred to as the "agent") the phone (or an automated call forwarding system) may respond to the call and/or forward/transfer the call and/or associated data to an extension of a staff member who can respond to the caller. The extension is typically associated with a physical location of a phone, such as a phone in the staff member's office or a particular location in the school. Oftentimes, the staff member is unavailable to receive the incoming call and/or associated data because the staff member is away from the phone or because the phone cannot display or otherwise provide the associated data. For example, if the staff member is a security guard, then the guard may be located at numerous locations throughout the day, such as common areas including the main entrance during the beginning and end of the school day, the cafeteria during lunch time, recreational areas, auditoriums, classrooms, and offices. Thus, the security guard travels to multiple locations at different times throughout the day. While some security guards carry paging devices, these paging devices tend to have limited service areas that restrict communications outside of a geographic area and limited functionality that restrict communications to a short text message such as a phone number. These paging devices also do not transmit communications and/or data back to the call center such as confirmations that a message affiliated with an incoming call was reviewed, location of the paging device (e.g., paging device of Mr. Johnson is located on $3^{rd}$ floor/classroom 311), and so on. Still further, most people today tend to carry multiple communications devices, such as a pager, personal digital assistant (PDA), and cell phone. However, the school's call center typically does not leverage the multiple communications devices of a staff member (and/or of a student) because each of these communications devices is customized in terms of software, hardware, and network configuration. For example, the PDA and the cell phone have different software applications, data processing, storage, management, and communications systems.

To further complicate the dissemination instructions for communications, the call center must be able to effectively communicate risks by locating and accessing multiple communications devices utilized by the staff (and/or the students and/or other individuals on campus). For example, the call and/or associated data must be in a format that can easily be exchanged or otherwise shared with each communications device. For example, if the agent wants to share contact information (e.g., name, phone numbers, addresses, etc.) with a cell phone and a pager of a staff member, then the agent typically must enter this information twice—once on a platform communicating with the cell phone and once on a platform communicating with the pager. Another barrier is providing the communication and/or associated data in a standardized or otherwise compatible data format, depending on functionality limitations of the communications device, so that each communications device has efficient and effective access to the information. For example, conventional wireless phones have limited functionality compared with personal computers (PC). Typically, wireless telephones provide limited contact information, such as a telephone listing by name rather than full address books and/or calendars. Additionally, conventional wireless telephones are unable to run application/software packages and may have limited capabilities for transmitting, receiving, and displaying video data.

Accordingly, call centers for schools need integrated systems and methods that can track and identify communications (incoming, internal, and external communications), provide immediate access to resources (e.g., staff, students, guests, and emergency response personnel), and improve campus communications. The integrated systems and methods must support various communications infrastructures to capitalize on emerging communications devices such as, for example, interactive pagers, on-site pagers, wireless phones, personal computers, personal digital assistants (PDAs), etc.

BRIEF SUMMARY OF THE INVENTION

The aforementioned problems and others are solved by systems and methods that provide a dynamic computer telephony integration (CTI) campus call center for enhancing school safety (hereinafter referred to as the "DCTIC call center" and the "school call center"). The DCTIC call center comprises systems and methods that leverage the assets of a school's communications systems. These assets are leveraged to facilitate improved access, sharing, notification, and/or management of communications and associated data of the school's call center. The school's communications systems may include, for example, internal telecommunications networks, information systems, data networks and applications of public telecommunications networks (e.g., public switched telephone network (PSTN) or mobile telecommunications switching office (MTSO)), public data networks (e.g., the Internet), and/or various communications devices of a staff member, a student, a guest, and/or an emergency response party. The communications may comprise internal and external communications including incoming and outgoing calls, electronic messaging, pager messaging, and other communications over electronic communication devices. These communications may also comprise any associated data, such as ICLID information, information provided by a communications profile, and status data. Some advantages of the DCTIC call center include faster notification of emergency situations, faster access to staff, students, data, and/or other personnel (e.g. emergency response personnel, law enforcement, etc.), ability to communicate calls and associated data to a designated party (e.g., staff, students, guests, emergency response personnel, and/or third parties) over a variety of communications devices, less operator/agent intervention, and enhanced safety services (e.g., communication recording service, locating the communications device providing the communication, deactivation of privacy features associated with the communication, and automated dissemination instructions for safety response).

An embodiment of this invention describes a computer telephony integration (CTI) system having a call management system for connecting at least one agent station with at least one telephone line. Typically, the agent station includes a personal computer and/or a telephone that the agent uses to answer, respond to, and/or transfer communications (including associated data) to a call center. The system includes detection means for detecting the communication, an input/output processor to input and to output data associated with the communication, a communications interface for communicating the communication and/or associated data with a communications device associated with a designated party (e.g., staff, student, guest, and/or emergency response personnel), a memory device for storing the data, a processor communicating with the memory device, and a call center application for managing a communications profile. In a further embodiment, the system includes a dataserver that functions as a database and a server to store and retrieve one or more communications profiles. The processor selects data stored in the memory device based upon the communications profile, and typically includes information about (1) calling number source data associated with the communication, (2) location data associated with the communication, (3) communication recording data services, (4) dissemination instructions for at least one of the communication and the data to a communications device of a designated party, (5) data associated with the designated party, (6) data associated with the school call center, and (7) data associated with the communications device. Further, the communications interface may include means for providing messaging delivery means for delivering and confirming receipt/review of the communication (including associated data). In various embodiments, the communications device may be a transmitter, a telephone, an intercom communications device, a personal computer, a wireless communications device, an on-site pager, a mobile phone, a wireless phone, a WAP phone, an IP phone, a satellite phone, a computer, a modem, a pager, a digital music device, a digital recording device, a personal digital assistant, an interactive television, a digital signal processor, a Global Positioning System device, and other similar communications devices. In still further embodiments, the system may further include means for locating the locating the communications device, associating a registration profile with the communications device, and deactivating a privacy feature associated with the communications device.

In another embodiment, the system further includes status means for communicating a status of the communications device associated with the designated party of the DCTIC call center to the call center application. Typically, the status provides information about availability and/or location of the designated party, availability and/or location of the communications device, messaging delivery capabilities of the communications device, and/or messaging delivery confirmation to the communications device. Further, the system may include status processing means that use the status to provide routing instructions to the communications interface for connecting the incoming call and/or associated data with the communications device.

In another embodiment, the system further includes a personal identifier device that is capable of transmitting signals to a transmitter communicating with the school call center. The personal identifier device is associated with the designated party so that the transmitted signals can be used to locate the designated and provide availability data and/or location data of the designated party. The system may communicate with a variety of private and public networks, such as a Public Switched Telephone Network (PSTN) and a Mobile Switching Telephone Office (MSTO).

Other embodiments describe methods for receiving a communication within a school call center or other similar system (e.g., private branch exchange (PBX)) that connects at least one agent station with at least one telephone line, associating a communications profile with the communication, using the communications profile to initiate safety features and/or accessing a communications network, and communicating the communication and/or the associated data. Similar to above, the communications profile may include information about (1) calling number source data associated with the communication, (2) location data associated with the communication, (3) communication recording data services, (4) dissemination instructions for at least one of the communication and the data to a communications device of a designated party, (5) data associated with the designated party, (6) data associated with the school call center, and (7) data associated with the communications device. Still further, the method may include determining a status, and based upon the status, communicating the communication and/or data to the communications device of a designated party (e.g., a staff member and/or a guest). Similar to above, the status provides information about availability and/or location of the designated party, availability and/or location of the communications device, messaging delivery capabilities of the communications device, and/or messaging delivery confirmation to the communications device. Further, the system may include status processing means that uses the status to provide routing instructions to the communications interface for connecting the communication and/or associated data with the communications device.

A further embodiment describes a network of interconnected communications devices associated with a school call center, a rule-based application dataserver for storing and retrieving a communications profile, and an application program installed in an agent station for managing the communications profile. Further, the communications profile includes the means to enable an exchange of an incoming communication and/or associated data between an agent station of the call center and a communications device of a designated party (a staff member, student, guest, and/or emergency response personnel) affiliated with the school call center. Still further, another embodiment describes a method of receiving a communication to a school call center from a communications device registered with a campus safety/security system, using inputs to the campus safety/security system to initiate call safety features and/or access a communications network, associating the inputs to the campus safety/security system with the communication to provide a communications profile, and communicating at least one of the communication and the data to the communications device of the designated party.

BRIEF DESCRIPTION OF THE SEVERAL VIEWS OF THE DRAWINGS

The above and other embodiments, objects, uses, advantages, and novel features of this invention are more clearly understood by reference to the following description taken in connection with the accompanying figures, wherein.

DETAILED DESCRIPTION OF THE INVENTION

Figure 1:
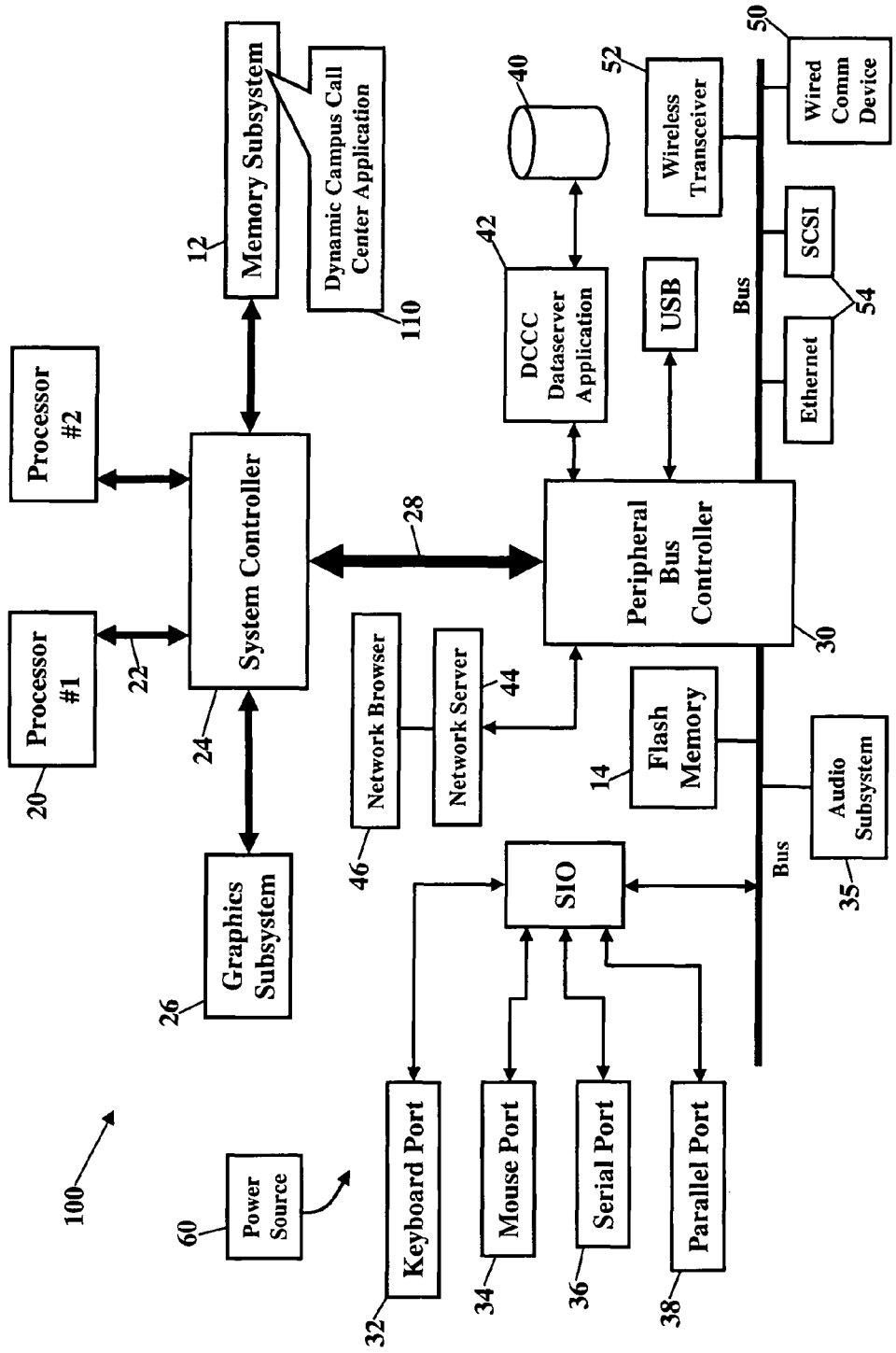
FIG. 1 is a block diagram showing of an exemplary dynamic campus call center application operating in an agent station according to an embodiment of this invention.

This invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, flowcharts, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

The aforementioned problems and others are solved by a dynamic computer telephony integration (CTI) complete school contact center (hereinafter referred to as the "DCTIC call center," or alternatively, as the "school call center"). The DCTIC call center, hereinafter the "Dynamic Campus Call Center" or "DCCC," comprises systems and methods that leverage the assets of a school's communications systems including internal telecommunications networks, information systems, data networks, and applications, of public telecommunications networks (e.g., public switched telephone network (PSTN) or mobile telecommunications switching office (MTSO)), of public data networks (e.g., Internet), and/or of various communications devices of various communications devices of a staff member, a student, a guest, and/or an emergency response party in order to facilitate improved access, sharing, notification, and/or management of communications (e.g., internal and external communications including incoming and outgoing calls, electronic messaging, pager messaging, and other communications over electronic communication devices) and associated data (e.g., ICLID information, information provided by a communications profile, status data, etc.) of the school's call center. Some advantages of the DCTIC call center include faster notification of emergency situations, faster access to staff, students, data, and/or other personnel (e.g. emergency response personnel, law enforcement, etc.), ability to communicate calls and associated data to a designated party (e.g., staff, students, guests, emergency response personnel, and/or third parties) over a variety of communications devices, less operator/agent intervention, and enhanced safety services (e.g., communication recording service, locating the communications device providing the communication, deactivation of privacy features associated with the communication, and automated dissemination instructions for safety response). As used herein, the term "data" includes electronic information, such as information and/or files stored in a database, electronic messages such as email, notifications, replies, and/or other means of communicating electronic information between or among the school's communications system (including the agent station), the public telecommunications networks, the public data networks, and/or of various communications devices of a designated party.

Referring now to the figures, FIG. 1 is a block diagram showing a Dynamic Campus Call Center (DCCC) Application 110 residing in an agent workstation station 100. The DCCC Application 110 operates within a system memory device. The DCCC Application 110, for example, is shown residing in a memory subsystem 12. The DCCC Application 110, however, could also reside in flash memory 14 and/or in a peripheral storage device, such as storage device 40 associated with a DCCC DataServer Application ("App") 42. The agent station 100 also has one or more central processors 20 executing an operating system. The operating system, as is well known, has a set of instructions that control the internal functions of the agent station 100. A system bus 22 communicates signals, such as data signals, control signals, and address signals, between the central processors 20 and a system controller 24 (typically called a "Northbridge"). The system controller 24 provides a bridging function between the one or more central processors 20, a graphics subsystem 26, the memory subsystem 12, and a PCI (Peripheral Controller Interface) bus 28. The PCI bus 28 is controlled by a Peripheral Bus Controller 30. The Peripheral Bus Controller 30 (typically called a "Southbridge") is an integrated circuit that serves as an input/output hub for various peripheral ports. These peripheral ports could include, for example, a keyboard port 32, a mouse port 34, a serial port 36 and/or a parallel port 38. Additionally, these peripheral ports would allow the agent station to communicate with a variety of communications devices through ports 54 (such as SCSI or Ethernet), Wireless Transceiver 52 (using the family of IEEE 802.11 Wireless standards, the Industrial and Scientific portion of the electromagnetic spectrum, and/or the Infrared portion of that same spectrum), and Wired Comm Device Port 50 (such as modem V90+ and compact flash slots). The Peripheral Bus Controller 30 could also include an audio subsystem 35. The Peripheral Bus Controller 30 may also interface with a universal serial bus ("USB") 56. Additionally, the agent station may include a network server 44 operating with a network browser 46. The DCCC DataServer Application 42, the network server 44, and the network browser 46 may be stand alone or integrated components. Still further, the agent station 100 may include a power source 60, such as a rechargeable battery to provide power and allow the agent station 100 to be portable. The power source 60 may additionally or alternatively include an alternating current (AC) power source or power converter.

The processor 20 is typically a microprocessor. Advanced Micro Devices, Inc., for example, manufactures a full line of microprocessors, such as the ATHLON™ (ATHLON™ is a trademark of Advanced Micro Devices, Inc., One AMD Place, P.O. Box 3453, Sunnyvale, Calif. 94088-3453, 408.732.2400, 800.538.8450, www.amd.com). Sun Microsystems also designs and manufactures microprocessors (Sun Microsystems, Inc., 901 San Antonio Road, Palo Alto Calif. 94303, www.sun.com). The Intel Corporation manufactures microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com).

The preferred operating system is the UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, www.redhat.com). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080, www.microsoft.com). and Mac® OS (Mac® is a registered trademark of Apple Computer, Inc., 1 Infinite Loop, Cupertino, Calif. 95014, 408.996.1010, www.apple.com).

The system memory device (shown as memory subsystem 12, flash memory 14, or peripheral storage device 40) may also contain one or more application programs. For example, an application program may cooperate with the operating system and with a video display unit (via the serial port 36 and/or the parallel port 38) to provide a Graphical User Interface (GUI) display for the DCCC Application 110 (e.g., GUI displays for a staff, student, guest, and/or emergency response personnel directory, a work profile of a staff member, a guest profile of a school guest, a messaging screen for inputting a message and/or associated data, and a communications profile associated with the work profile, guest profiles, status, and/or business requirements). The GUI typically includes a combination of signals communicated along the keyboard port 32 and the mouse port 34. The GUI provides a convenient visual and/or audible interface with the user of the agent station 100. As is apparent to those of ordinary skill in the art, the selection and arrangement of the DCCC Application 110 may be programmed over a variety of alternate mediums, such as, for example, a voice-activated menu prompt.

Typically, the DCCC Application 110 is running on the agent station 100 when the communication (including communications from external communications systems as well as communications initiated within the school's communication system) is detected at the call management system (or other similar system) by an automated call management and/or call routing system. The communication is commonly an incoming telephone call associated with data (using responses input by an individual and/or using the address and information of the communication signal) that triggers the DCCC DataServer Application 42 to provide a communications profile of associated data along with the communication to the agent station 100 (similar to decoding an ICLID signal for telecommunication special service features offered by telecommunication service providers). Alternatively, the communication may be an electronic message (e.g., email), facsimiles, and/or other communications. The DCCC Application 110 allows an agent (or other authorized staff) of a school call center to manage services provided by the DCTIC call center, such as: (1) accessing a staff (and/or student, guest, and/or emergency response party) directory including staff profiles that provide up-to-date detailed information about the staff member, such as looking up the name of the staff member, a status of the staff member, and other information of the staff member (e.g., job title, job description, department, business address, office hours, business associates such as secretaries, communications devices including personally owned/operated and employer affiliated, and routing addresses of the communications devices such as radio frequency identifiers, service node addresses, IP addresses, email addresses, and/or other electronic address information); (2) messaging options, such as taking, saving (e.g., email, voicemail, journal, etc.), retrieving, distributing (e.g., routing to one or more designated parties, delivery options including dates, times, priorities, etc.), and modifying a message; (3) issuing a query to determine the status of the designated party (e.g., staff member, student, guest, and/or emergency response party); (4) customizing the communications profile associated with DCCC DataServer Application 42 including an access agent, a messaging agent, and a safety/security requirements agent; (5) customizing presentation, features, and/or management of the communication and/or associated data; and (6) controlling communications outside of the school's communications system, such as communications with a telecommunications network and/or a data network. For example, the agent (or the automatic call distributor using response rules received from an interactive response system) may interact with the Access Agent to control up-to-date staff, student, guest, and/or emergency response personnel directories, search for the designated party, use the staff, student, guest, and/or emergency response profile (e.g., profile associated that includes names, contact information, and protocols for emergency response situations), a registration profile (e.g., a profile associated with a registered guest, including name, contact information, communications devices, schedules, etc.), and/or the communications profile to launch a query to determine the status, receive the status, and communicate the status to a Messaging Agent to manage communications with the designated party.

In an embodiment, the DCCC DataServer Application 42 has the ability to communicate with various networks, including internal and external telecommunications and/or data networks using appropriate protocols, such as standard Transmission Control Protocol and Internet Protocol (TCP/IP). The communications profiles stored by the DCCC DataServer Application 42 provide increased security by allowing the school center to internally control electronic data, utilize existing databases to add, delete, or otherwise change electronic data, and control how the school's communications system interacts with non-proprietary networks and communications devices, such as controlling routing instructions. Thus, DCCC DataServer Application 42 and associated systems may function as a computer server, database, and processor and is dedicated to managing DCCC activity over the school's proprietary and non-proprietary networks.

The DCCC Application 110 also allows the agent (or another authorized staff member) to control access, sharing, notification, routing, security, management, and/or additional processing of incoming communications and associated data. For example, DCCC Application 110 allows the agent to control how the associated data is processed into the communications system of the school call center including (i) sending the data to a local storage device (such as local file server 416 shown in FIG. 4), or alternatively, to a remote storage device (such as a file server associated with a the telecommunications service provider, for example, database 1518 of FIG. 15), (ii) archiving the data, (iii) encrypting the data, (iv) copying the data, and (v) associating the data with the communications profile. The DCCC Application 110 may be downloaded from a telecommunications network 404, a data network 430, or provided on a storage media (e.g., diskette, CD-ROM, or installed by the computer system manufacturer) to install on the agent station 100 to enable, disable, and further control a variety of DCCC Services. Still further, the DCCC Application 110 allows the agent (or other authorized staff) to customize presentation features, such as splitting a workstation screen into two viewing areas and presenting a video display of the communication in one portion and presenting information associated with the Access Agent (e.g., staff directory) in the second portion.

Figure 2:
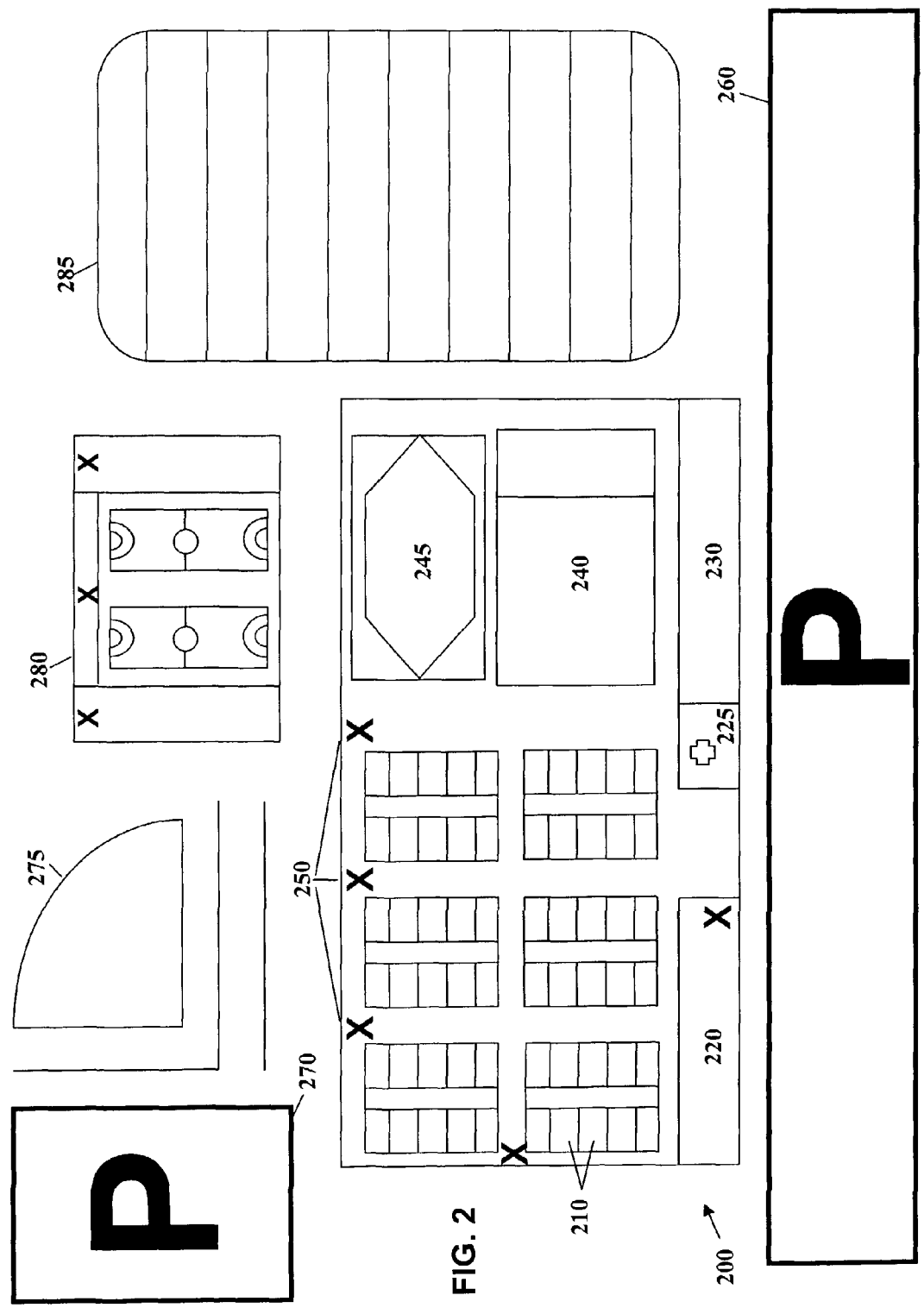
FIG. 2 is a schematic of an exemplary layout of a school/campus.
Figure 3:
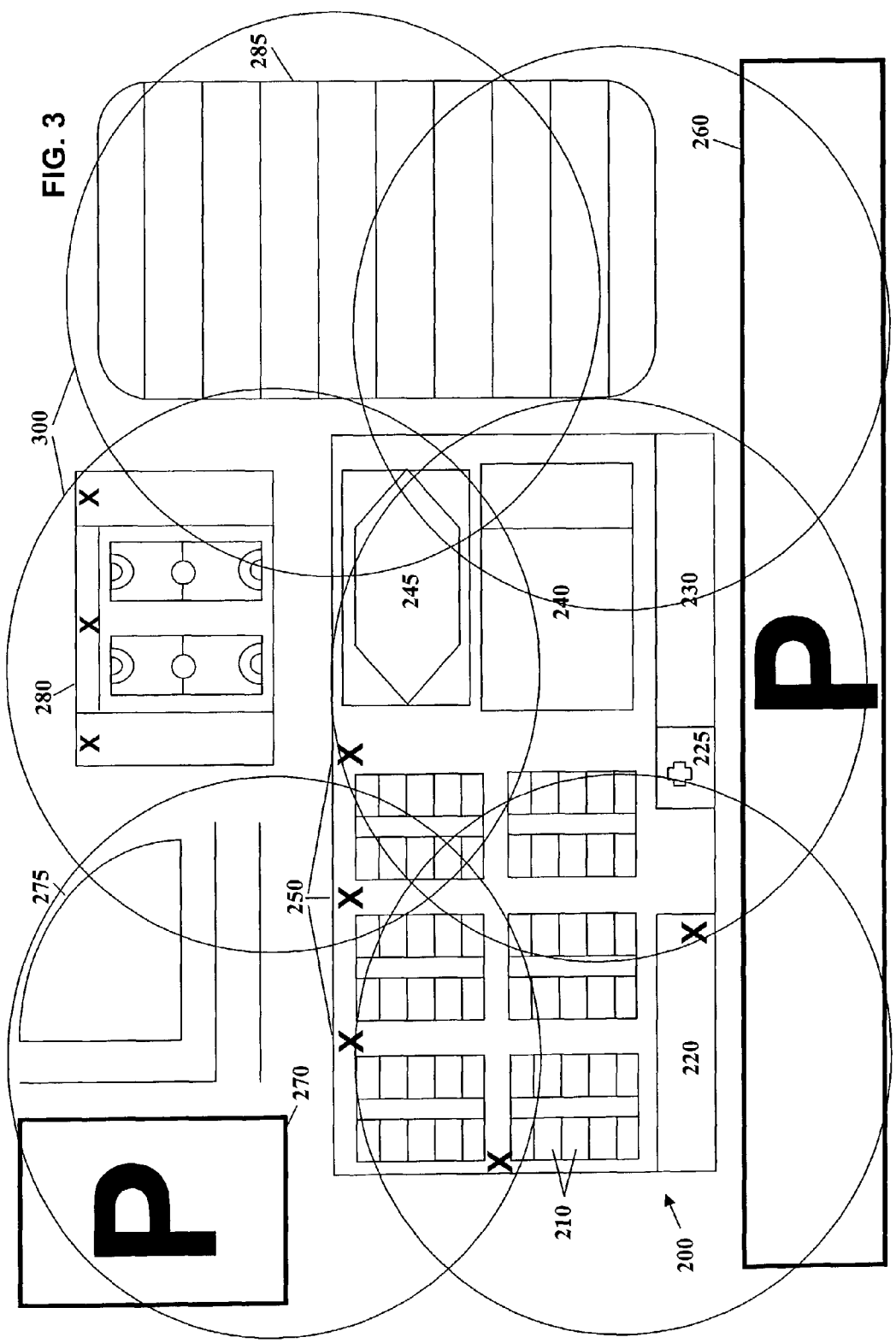
FIG. 3 is a schematic of the school/campus of FIG. 2 and further illustrates communications zones.

FIG. 2 is a schematic showing an exemplary layout of the facilities of a school (also referred to as a "campus") 200. The school 200 includes at least one classroom 210, administrative offices and meeting rooms 220, a medical safety center 225, a library and information resource center 230, an auditorium 240, a cafeteria 245, at least one stairway 250, a main parking lot 260, an athletic event and overflow parking lot 270, a athletic field 275, a gym 280, and a stadium 285. As shown in FIG. 3, the school 200 has multiple communication zones 300 for the transmitting and receiving communications signals from a wireless communications device. As illustrated in FIGS. 4-15, each of these communications zones 300 may allow a wireless communications device (such as on-site pager 902 shown in FIG. 9) to transceive signals to one or more antennas/transceivers (such as antenna 450 shown in FIGS. 4-15).

Figure 4:
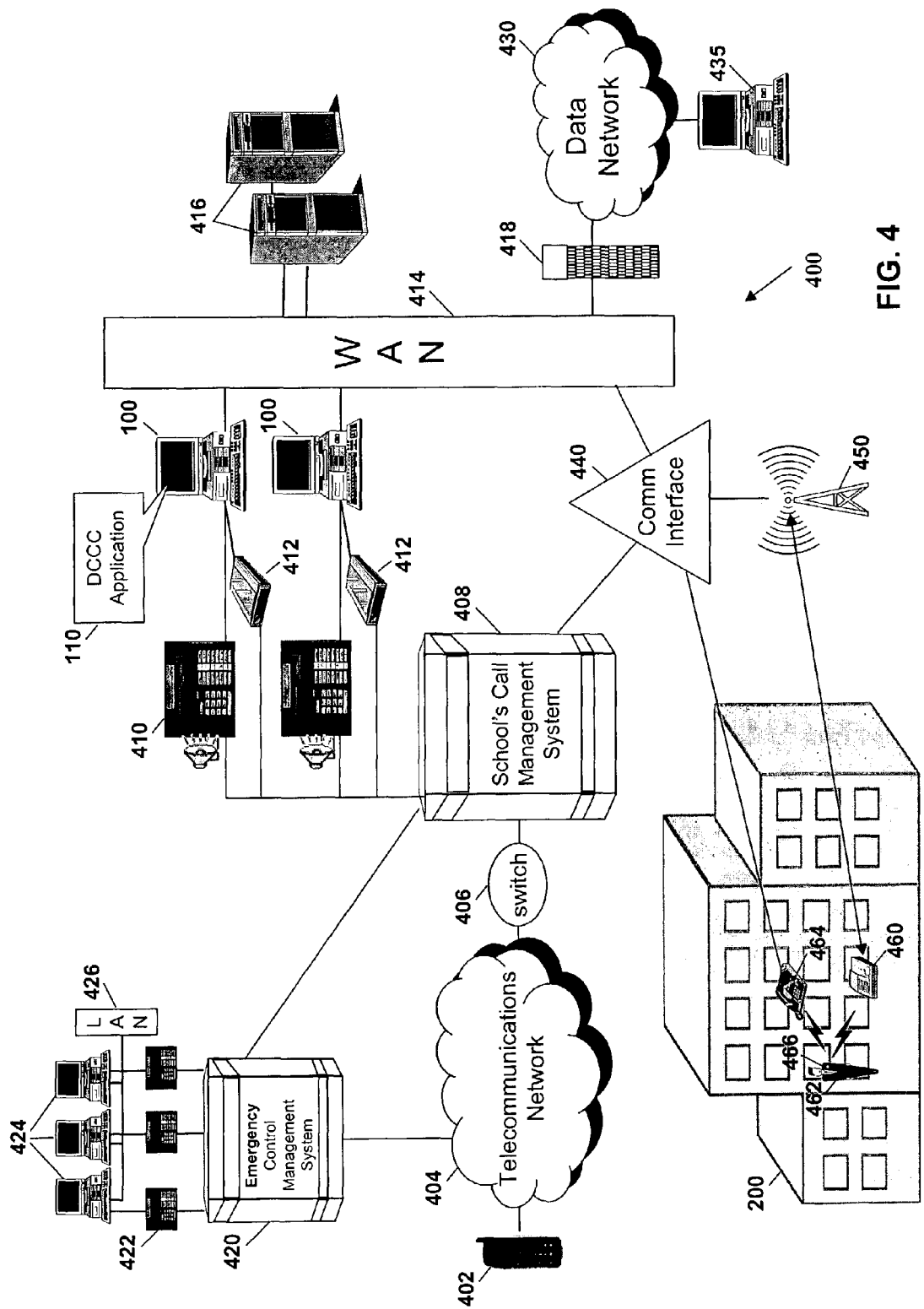
FIG. 4 is a schematic showing an exemplary operating environment for a DCTIC call center system that includes means for determining a status of a designated party and communicating with the designated party over a telephone and/or an intercom station according to an embodiment of this invention.

FIG. 4 is a schematic showing an exemplary operating environment for a DCTIC call center (DCCC) 400. The DCCC 400 includes a mobile telephone 402, a telecommunications network 404, a switch 406, a call management system 408, at least one telephone/voice workstation 410, at least one modem 412, at least one agent station 100, a DCTIC call center application 110, a wide area network 414, at least one file server 416, a firewall 418, an emergency control management system (such as 911 control and command centers) 420 including at least one operator telephone/voice workstation 422, at least one operator workstation 424, and a local area network 426, a data network 430, a remote personal computer 435, a communications interface 440, an antenna 450, a school 200, an intercom station 460, a designated party 462, an affiliated telephone 464, and a personal identifier transmitter device (also referred to as "personal identifier device") 466. The intercom station 460 is similar to traditional intercom systems; however, intercom station 460 may further include an audio subsystem (not shown) for broadcasting and receiving audio messages, a video subsystem (not shown), typically a liquid crystal display (LCD), for displaying images, a keyboard and/or mouse for inputting and/or otherwise selecting commands and/or data including safety/security commands that work with a campus safety/security system (e.g., interface with various campus communication devices (including intercoms), turn on audio/visual recorders proximate to the intercom station 460 to record events, dial 911, activate an audible alarm, contact local law enforcement, contact local medical personnel, etc.), and an internal transceiver (not shown) for receiving signals from personal identifier transmitter 466 and for sending signals to either the antenna 450 or to the communications interface 440 so that the designated party 462 can be located within the school 200. Methods and systems of using a transmitter and signaling to determine a proximate location of the transmitter (e.g., global positioning systems, fingerprinting techniques for cell phones, etc.) are known and will not be further described.

Typically, an individual (e.g., parent, potential guest, current guest, supplier, business acquaintance, etc.) uses mobile phone 402 (or an alternate communications device including wired and wireless communications devices) to place a call routed through telecommunication network 404 and switch 406 to the call management system 408 (to the called telephone number of the school). Alternatively, the individual may use the personal computer 435 to gain access to the DCCC 400 through data network 430. If so, firewall 418 screens and routes the communication over the WAN 414. The communication (e.g., incoming call) is usually detected by an interactive response system (or similar system for communications initiated by personal computer 435) that provides intelligent routing of the call. For example, the individual may hear a prerecorded message prompting the individual to make an initial routing selection, such as, for example "Press 1 to register for classes," "Press 2 to speak with an agent operator," "Press 3 for directions," "If you know the extension of the party (i.e., the designated party), please press * and the party's four digit extension," and so on. Thus, the communication may be initially routed to an appropriate agent (including operator agents affiliated with the emergency control management system 420) or to the extension of the designated party 462 (as described later, this extension may also be associated with a status of the designated party and the communication may be further routed based on the status to the communications device). If the communication is routed to the agent, then the call may be sent to the telephone/voice workstation 410 and/or through modem 412 to agent station 100. Further, the communication and initial routing instructions provide information about the call to the telephone/voice workstation 410 and/or the agent station 100. For example, if the calling telephone number of the communication is decoded and/or if the calling party provides a calling telephone number or another identifier (such as a social security number, an account number, and/or a name) in response to an inquiry from the automated answering system (or if the identifier is associated with other information like the ICLID signal of the calling number), then when the agent station 100 receives the communication, the DCCC Application 110 may automatically associate, retrieve, and pull up associated information (associated using responses to the interactive response system and/or ICLID signal) and/or a communications profile with the incoming call. After the agent answers the incoming call, the agent may gather additional information from the individual, associate other data to access a communications profile, identify the designated party 462 who can further handle the individual's needs, determine a status of the designated party 462, and based upon an available status, transfer the communication and associated data to an appropriate communications device, such as the workstation intercom 460 or the work telephone 464. If the status of the designated party is unavailable, then the agent may alternatively route the communication and/or associated data to a messaging system, such as voicemail or pager number messaging.

The agent and/or the automated answering system may determine the status of the designated party 462 by associating availability data of the designated party 462, location data of the designated party 462, availability data of the communications device, location data of the communications device (e.g., on-site pager 902 of FIG. 9) or location data of the personal identifier transmitter device 466, messaging delivery capability data of the communications device, and/or messaging delivery confirmation data with the communications device. Typically, the designated party 462 programs in protocols or rules related to his/her availability, location, and communications device. For example, the designated party 462 may input his/her work schedule including meetings, breaks, office hours and so on. Similarly, the designated party 462 may input specific times of unavailability (e.g., do not disturb), such as, for example, when the designated party is at a doctor's appointment. The location data of the designated party 462 and/or the communications device may also be used to determine a status of the designated party 462. In an embodiment, the designated party 462 wears the personal identifier transmitter device 462 that transmits signals (such as Radio Frequency (RF) signals, microwave signals, and/or any other portion of the electromagnetic spectrum or other means for identifying a location, such as, for example, a GPS transceiver, triangulation, or alternate location means) to nearby intercom station 460 in communication with antenna 450 or that transmits co-ordinates directly to antenna 450. The DCCC Application 110 maps the co-ordinates to associate a location within the school 200 (e.g., $3^{rd}$ floor/classroom 311). The location data may be further associated with the availability data of the designated party 462 to determine the status, such as whether the designated party 462 is available to receive the communication. For example, if the designated party 462 is located in a restroom, then the status of the designated party 462 may be unavailable.

The availability data of the communications device may also be used to determine the status. For example, if the telephone 464 is off-hook, then the telephone 464 may be unavailable to receive the communication and/or associated data. The telephone 464 may represent the extension of designated party 462 or, alternatively, telephone 464 may be associated with the designated party 462 through the communications profile and/or through determining the location of the designated party 462 and nearby facility communications devices (e.g., the designated party is in a classroom on the $3^{rd}$ floor and the communications devices proximate to that classroom includes an intercom in the hallway and a telephone). In addition, the location of the communications device may be used to determine the status. For example, telephone 464 may be located in an office with an ongoing meeting, and therefore, the telephone 464 would be unavailable. Still further, the messaging delivery capability of the communications device may be used to determine the status. For example, if the intercom station 460 has the means to display video images and text files, then the intercom station 460 would be available to receive associated video and files with the communication. Finally, messaging delivery confirmation capabilities of the communications device may be used to determine the status. For example, if the telephone 460 is capable of providing a dual tone multi frequency signal, then the telephone 460 would be available to transmit a confirmation signal from the designated party 462 indicating that the communications and/or associated data (including messages) has been delivered and received by the designated party. Even if the telephone 464 is "busy" and therefore unavailable, communications could still be sent to the telephone 464 and/or to the intercom station 460. If, for example, the telephone 464 and/ or the intercom station 460 can receive text and/or video images, the telephone 464 and/or the intercom station 460 could display the name of the calling party. The designated party 462 could then decide whether to change their current status and accept the incoming communication.

The communication and/or associated data may include voice, video, text, and/or other electronic data that is routed over the wide area network 414 through the communications interface 440 (or alternate communications means as shown in FIGS. 10-13) to the available communications device (e.g., the intercom station 460 and/or telephone 464). The communications interface 440 not only communicates the communication and/or associated data, but also formats and/or otherwise configures the communication and/or associated data (including messages transcribed by an agent) for the communications device. For example, the data stored on file server 416 may need to be converted from a data format compatible with the agent station 100 (and/or for storage on the file server 416) to another data format compatible with the communications device. The data formats may include printed text formats, a voice data formats, a video data formats, a dual tone multi-frequency data formats, and a digital data format (e.g., ASCII). In addition, the communications interface 440 may further include message delivery means that provides confirmation, such as a symbol or short message, that the communications device of the designated party 462 has received the communication and/or associated data. Thus, the communications interface 440 advises an agent when there is a problem or error communicating the communication (including associated data) with the communications device. If there is a problem or error, then the agent may select an alternate communications device (if the status is available) to communicate the communication.

Figure 5:
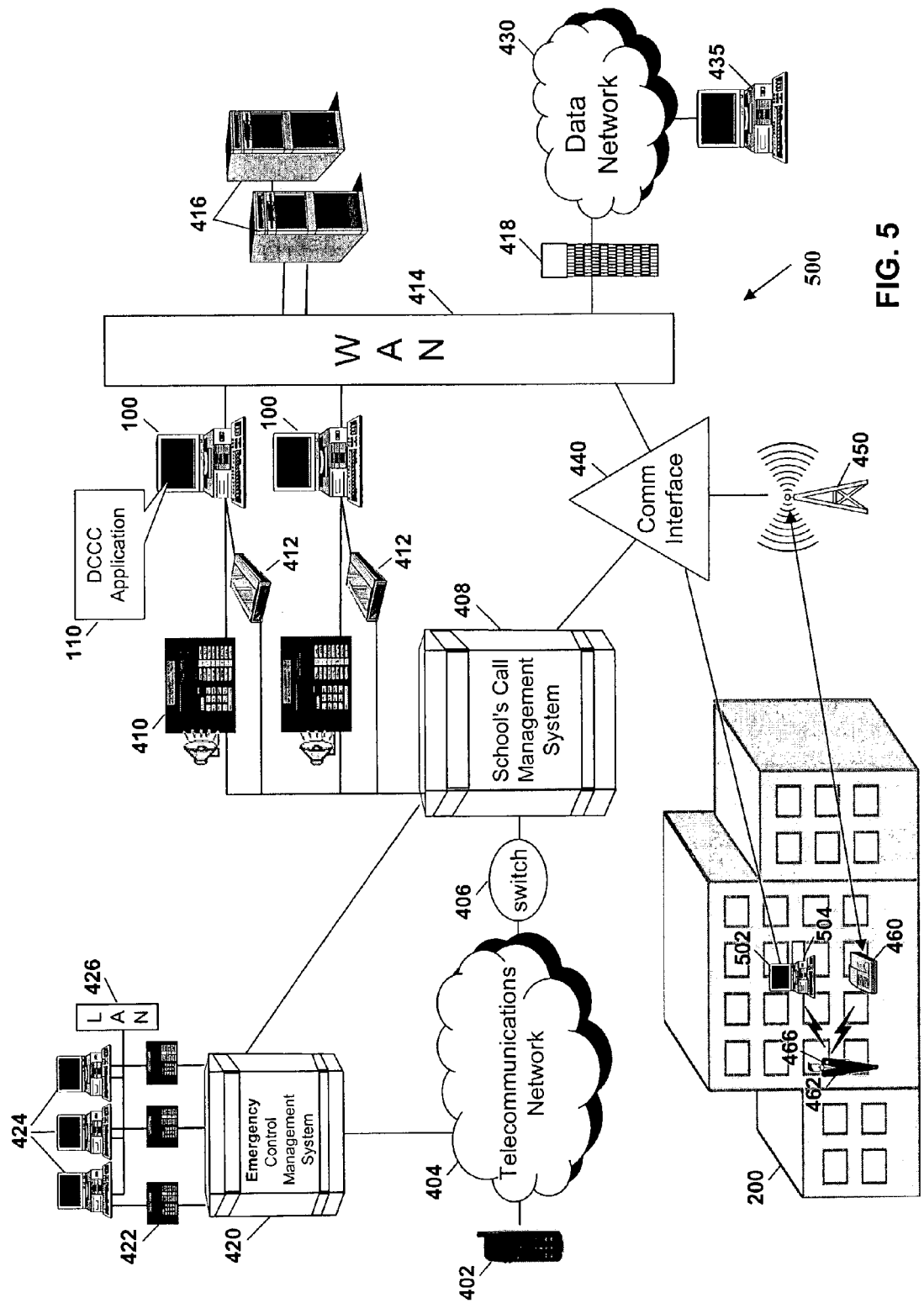
FIG. 5 is a schematic showing an exemplary operating environment for a DCTIC call center system that includes means for determining a status of a designated party and communicating with the designated party over a personal computer and/or an intercom station according to another embodiment of this invention.

Referring now to FIG. 5, a DCTIC call center (DCCC) 500 similar to the DCCC 400 of FIG. 4 is disclosed. FIG. 5 further includes an affiliated computer workstation 502 coupled with the school communications system through communications interface 440. According to this embodiment, the agent (or a router of the automated answering system) receives the communication and any associated data at his/her station 100, interacts with the calling individual, determines the status of the designated party 462, associates the status with the communications profile to select the nearby affiliated computer workstation 502, and provides the communication and/or associated data to the workstation 502 for the designated party 462 to access. As discussed above, the communications interface 440 ensures that the communication and/or associated data are formatted and/or otherwise configured for the workstation 502. Further, the communication and/or associated data routed to workstation 502 may be encrypted or otherwise secured so that only the designated party 462 has access. For example, workstation 502 may include a biometrics sensor 504, such as, for example, a fingerprint ID device. The biometrics sensor 504 may provide security features that prevent unauthorized parties from exploiting the communication and/or associated data. The biometrics sensor 504 could also comprise retina recognition device and software, DNA/RNA recognition device and software, facial recognition device and software, speech recognition device and software, and/or scent recognition device and software.

Figure 6:
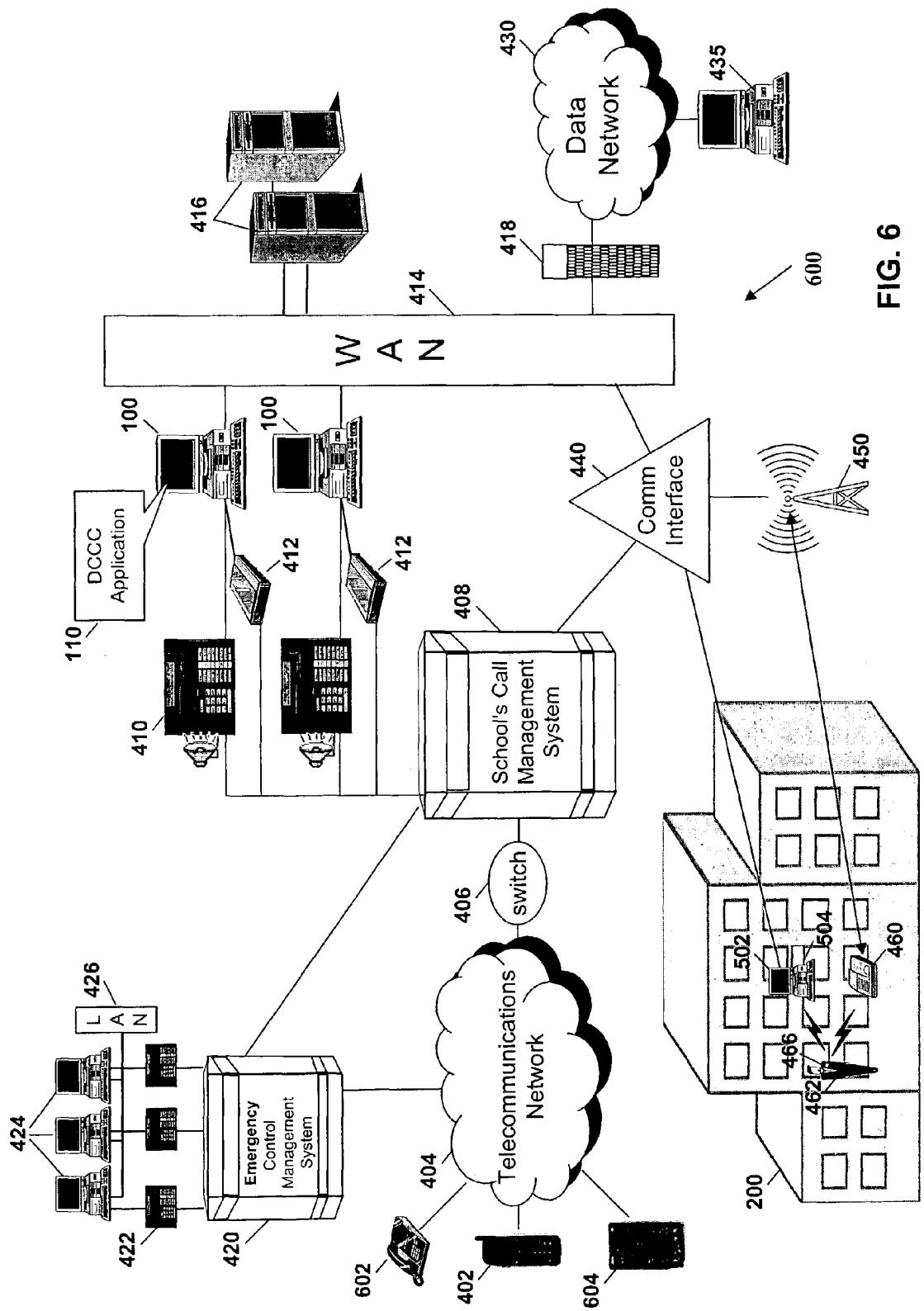
FIG. 6 is a schematic showing an exemplary operating environment for a DCTIC call center system that includes a variety of communications devices for communicating a communication according to another embodiment of this invention.

FIG. 6 illustrates a DCTIC call center (DCCC) 600 similar to the DCCC 500 disclosed in FIG. 5. FIG. 6 further includes a POTS phone 602 and a personal digital assistant 604 to illustrate that the individual may use other wired and wireless communications devices to gain access to the school's call management system 408 through telecommunications network 404.

Figure 7:
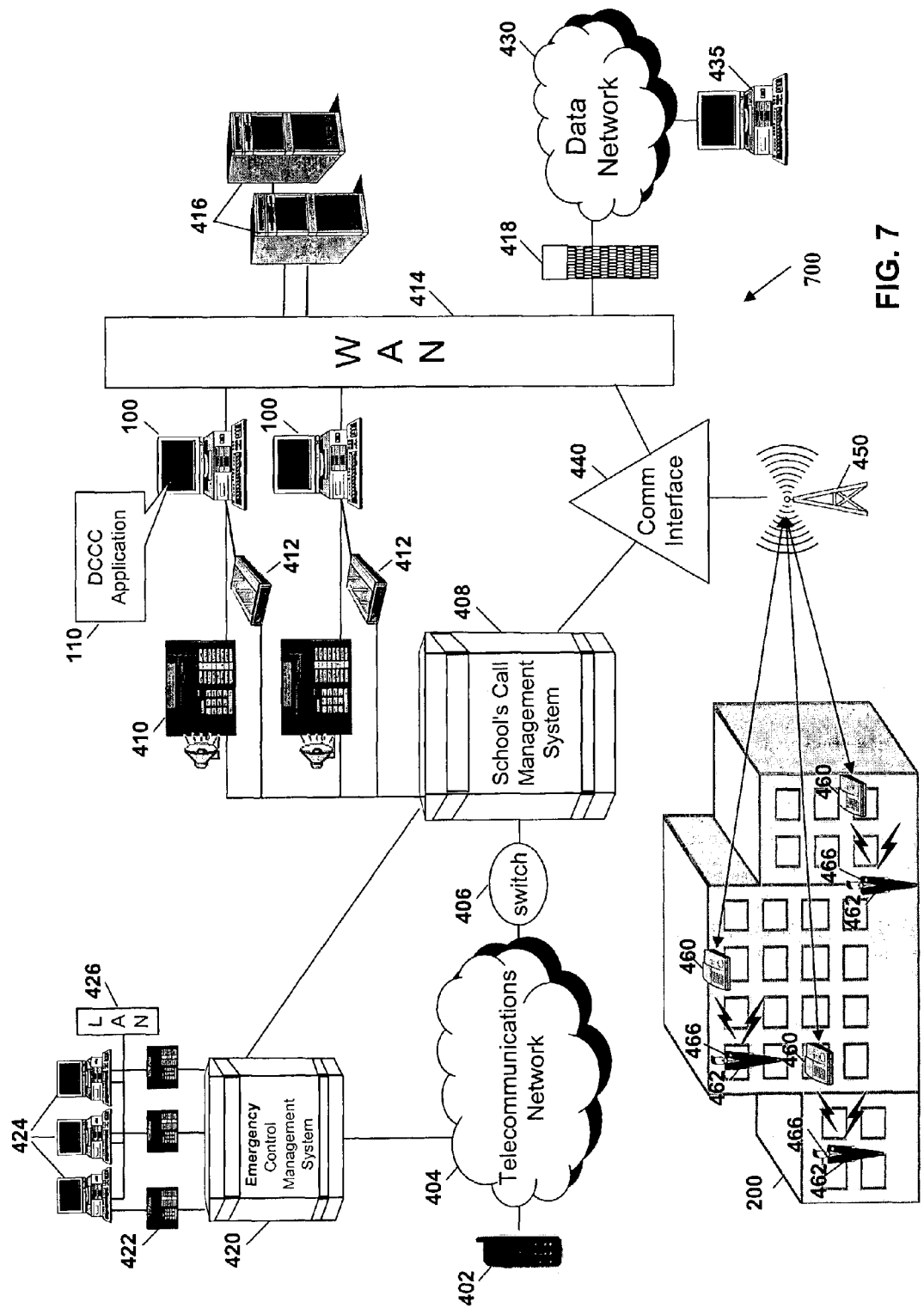
FIG. 7 is a schematic showing an exemplary operating environment for a DCTIC call center system that includes a plurality of intercom stations for determining a status and communicating with a plurality of designated parties according to another embodiment of this invention.

FIG. 7 illustrates a DCTIC call center (DCCC) 700 similar to the DCCC 500 disclosed in FIG. 5. However, FIG. 7 further includes a plurality of intercom stations 460 and a plurality of designated parties 462. According to this embodiment, the agent (or a router of the automated answering system) receives the communication and any associated data at his/her station 100, interacts with the individual and/or the communications profile (including group dissemination instructions) to identify multiple designated parties 462, determines the status of each of the designated parties 462 (when the status feature is activated), associates each status with one or more communications profiles to select a nearby intercom station 460 for each designated party 462, and provides the communication and/or associated data to each intercom station 460 for each designated party 462 to access. The intercom stations 460 are connected and associated so that the communication and responses to the communication are shared with the group of designated parties 462. Accordingly, this group messaging and conferencing feature determines the status of each designated party 462 in a group and simultaneously provides the communications and responses from each available communications device to the group. While not shown, each designated party 462 of the group could be accessed through alternate available communications devices (such as telephone 460 shown in FIG. 4, personal computer 502 shown in FIG. 5, pager 1010, personal digital assistant (PDA) 1012, interactive pager 1014, and mobile phone 1016 shown in FIG. 10, MP3 1202, digital signal processor 1204, modem 1206, and GPS 1208 shown in FIG. 12, and interactive television 1308 shown in FIG. 13). As discussed above, the communications interface 440 ensures that the communication and/or associated data are formatted and/or otherwise configured for each communications device.

Figure 8:
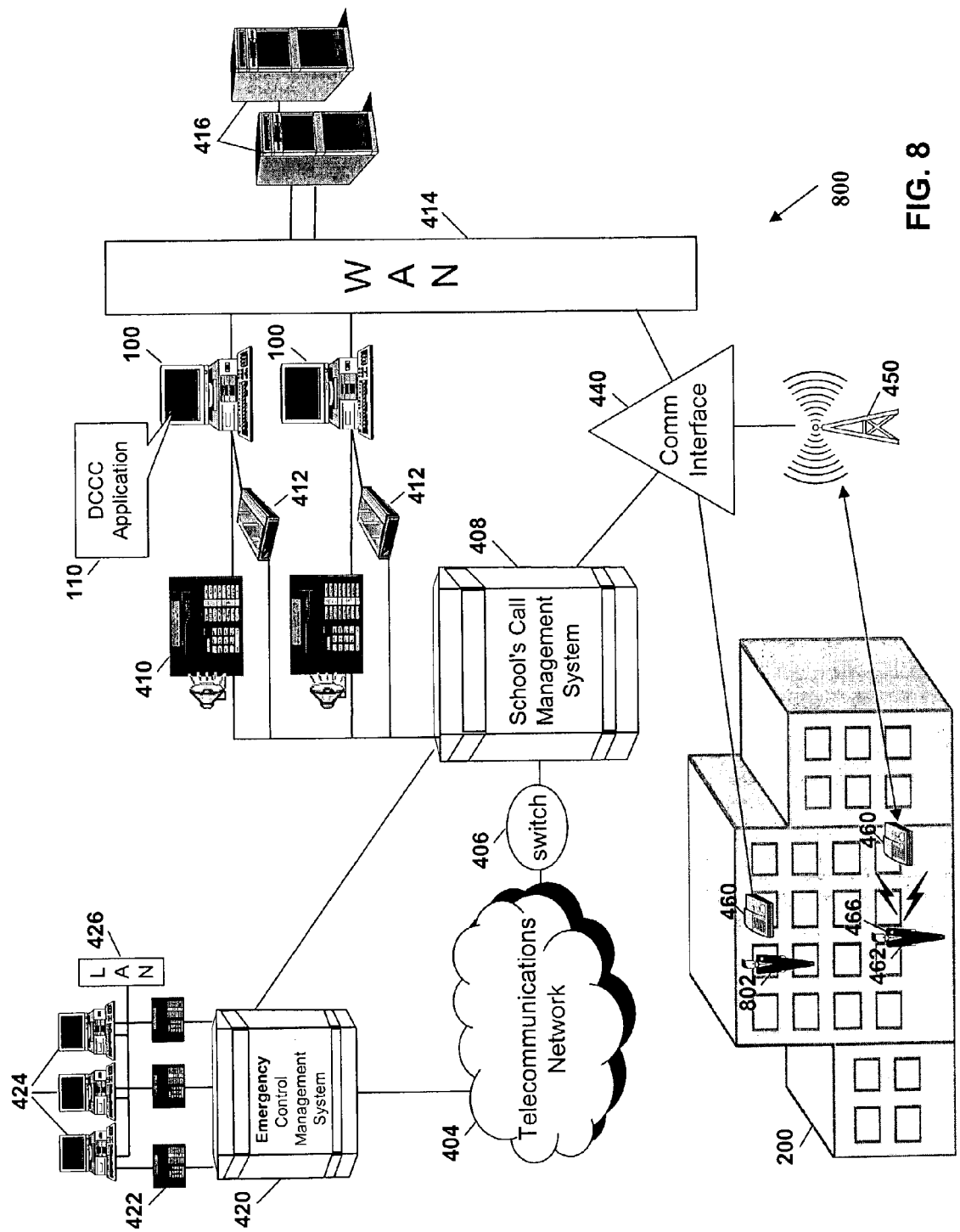
FIG. 8 is a schematic showing an exemplary operating environment for a DCTIC call center system that includes a staff member (and/or student or guest) utilizing an intercom station for determining a status and communicating an internal communication with a designated party according to another embodiment of this invention.

FIG. 8 illustrates a DCTIC call center 800 similar to the DCCC 700 of FIG. 7. However, according to the embodiment in FIG. 8, a staff member 802 (and/or a student and/or a guest) initiates the communication to the call center through intercom station 460. The agent (or automated answering system) receives the communication and any associated data at his/her station 100, interacts with the staff member 802 to identify designated party 462, determines the status of the designated party 462 (when status is activated), associates the status with the communications profile to select a nearby intercom station 460 (when status is activated), and provides the communication and/or associated data to the intercom station 460 for communications with the designated party 462. This embodiment illustrates the advantage of being able to internally use the DCCC 800 for staff (and/or students and/or guests) to more easily locate and communicate with highly mobile on-site staff (e.g., security guards, principal, etc.).

Figure 9:
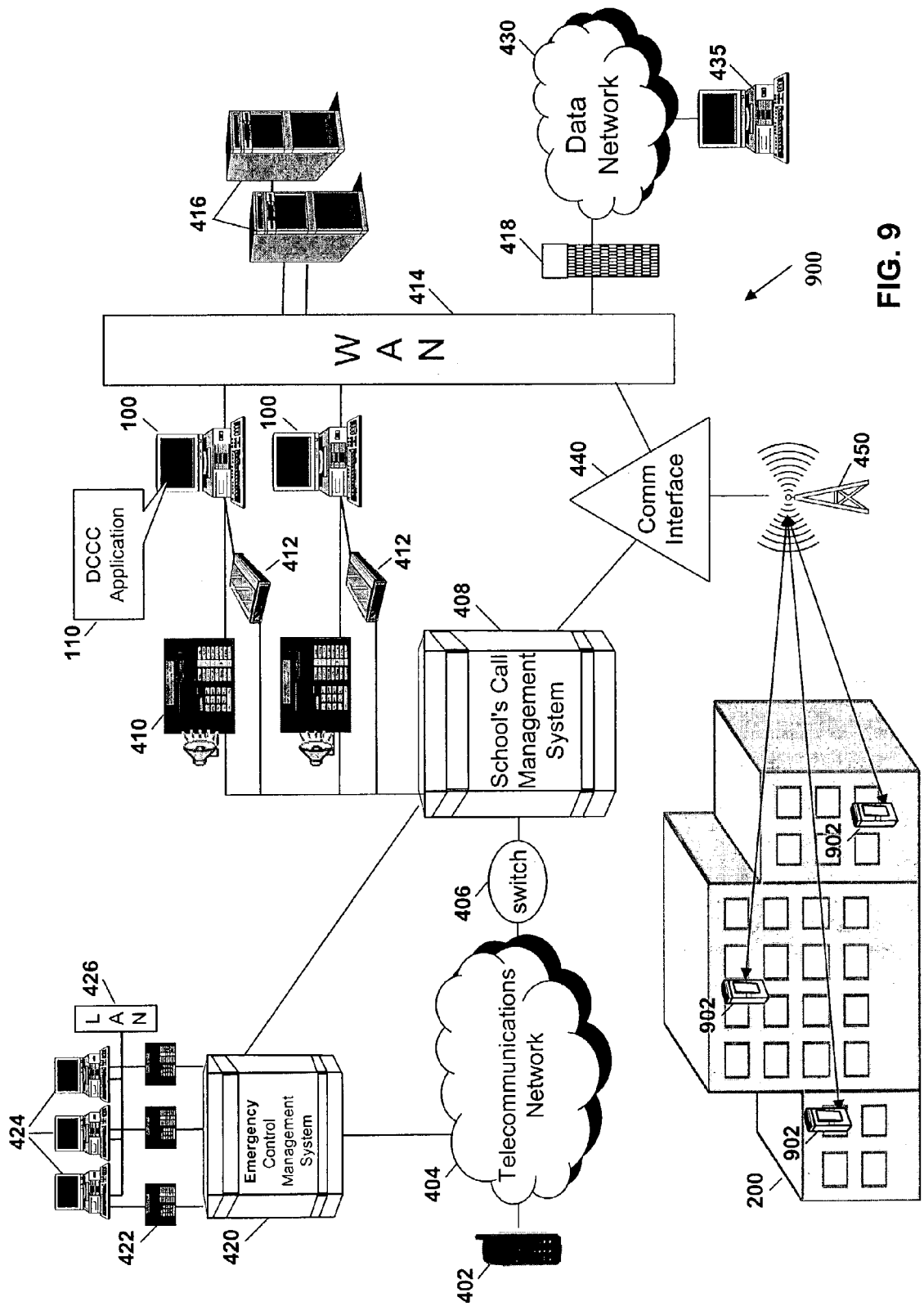
FIG. 9 is a schematic showing an exemplary operating environment for a DCTIC call center system that includes means for determining a status of several designated parties, each party having an on-site paging device according to another embodiment of this invention.

FIG. 9 illustrates a DCTIC call center (DCCC) 900 similar to the DCCC 700 disclosed in FIG. 7. However, FIG. 9 includes interactive, on-site messaging pagers 902 assigned to each designated party (not shown). According to this embodiment, the agent receives the communication and any associated data at his/her station 100, interacts with the individual, determines the status of each designated party, associates the communications profile to select the pager 902, and provides the communication and/or associated data to the pager 902 for each designated party 462 to access. Since the interactive pagers 902 allow each designated party to respond to the communication and/or data, this response can be shared with the other pagers 902 in the group.

Figure 10:
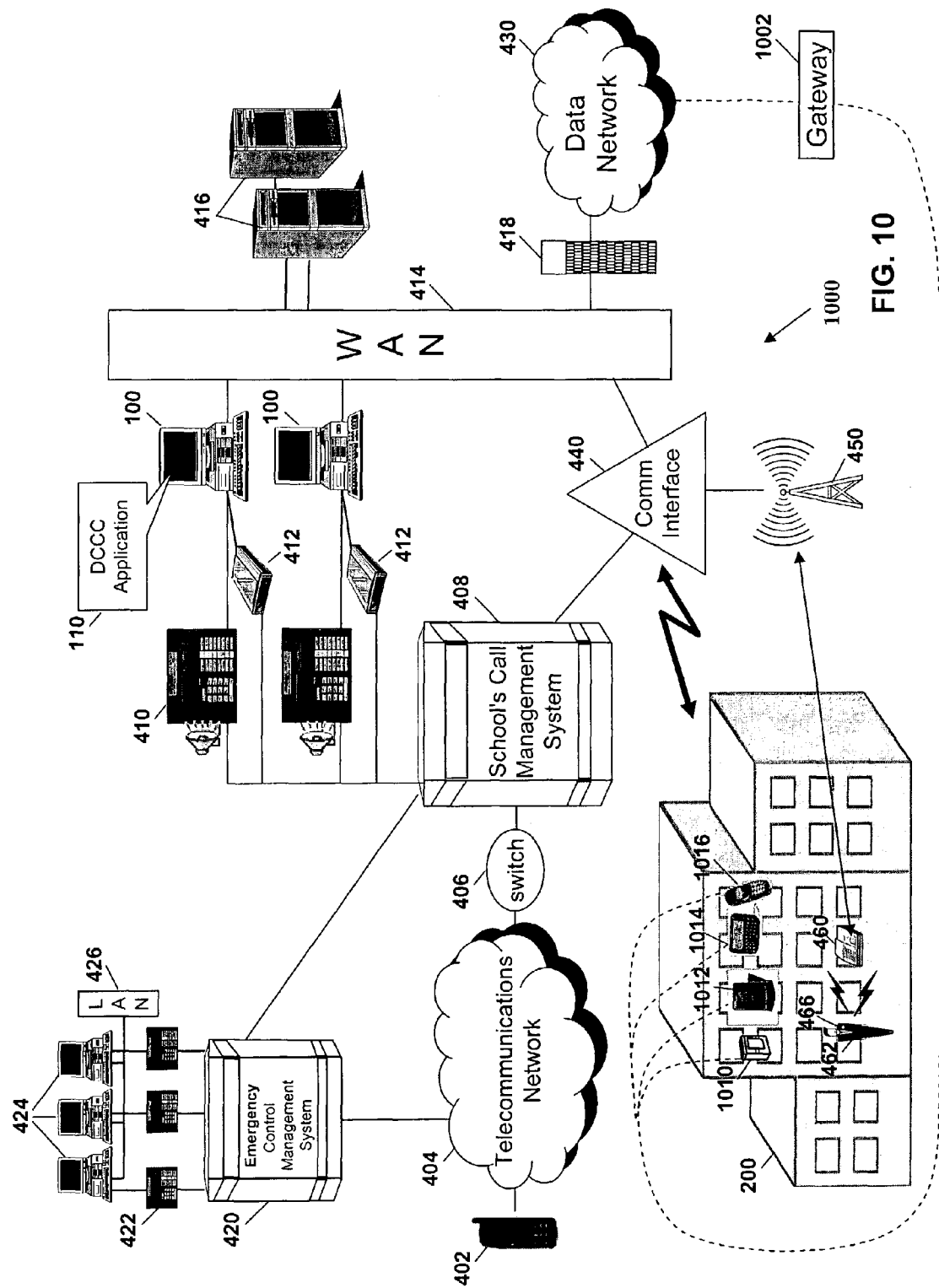
FIG. 10 is a schematic showing an exemplary operating environment for a DCTIC call center system that includes means for determining a status of a designated party and communicating with the designated party through an internal communications interface or a data network gateway to a wireless communications device according to another embodiment of this invention.
Figure 11:
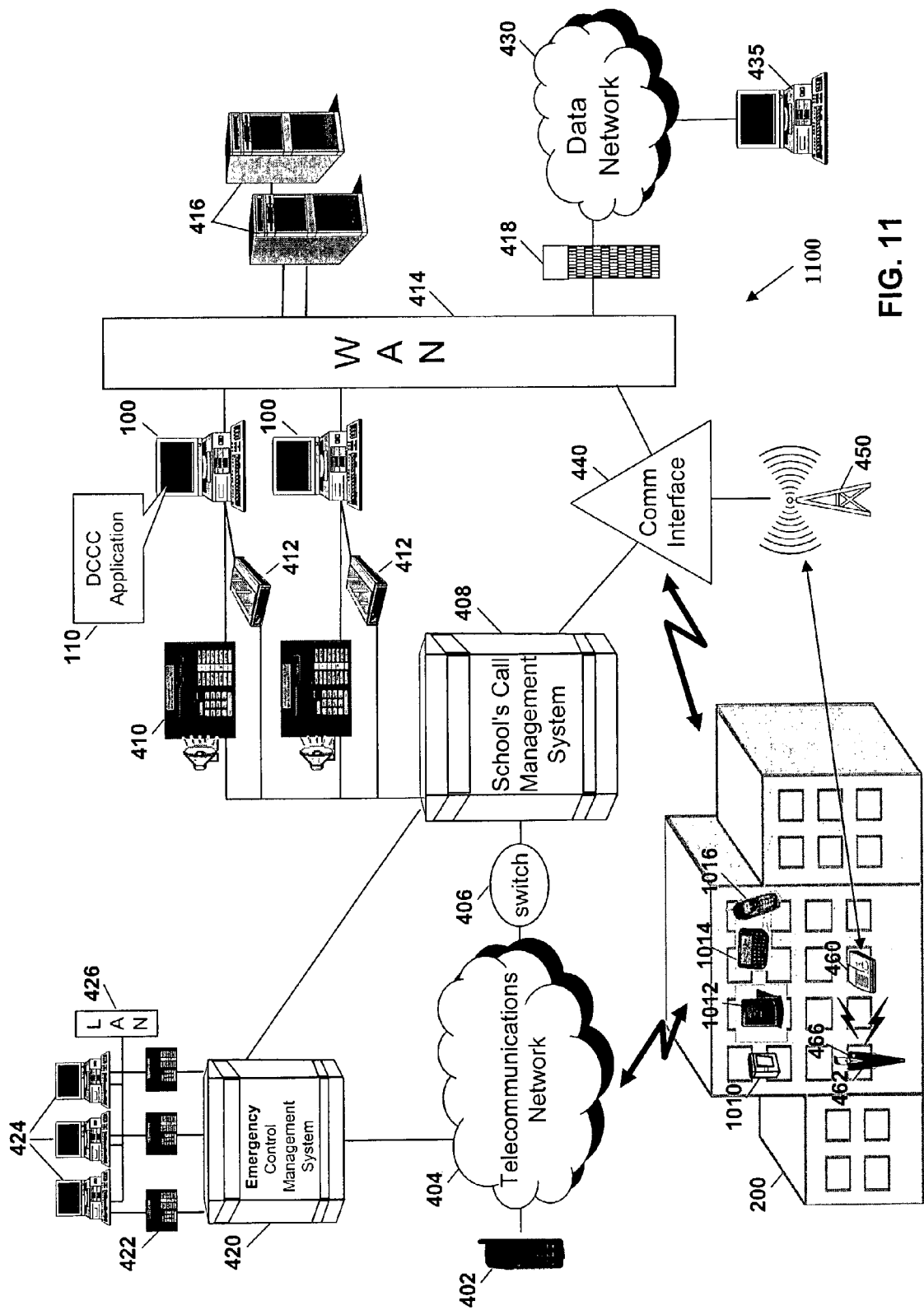
FIG. 11 is a schematic showing an exemplary operating environment for a DCTIC call center system that includes means for determining a status of a designated party and communicating with the designated party through an internal communications interface or a telecommunications network to a wireless communications device according to another embodiment of this invention.

FIGS. 10 and 11 illustrate a DCTIC call center (DCCC) 1000 similar to the DCCC 400 disclosed in FIG. 4. However, DCCC 1000 further includes a gateway 1002, a pager 1010, a PDA 1012, an on-site, interactive pager 1014, and a mobile phone 1016. According to this embodiment, the agent receives the communication and any associated data at his/her station 100, interacts with the individual to identify the designated party 462, determines the status of the designated party 462 (when status is activated), associates the status with the communications profile to select one or more of the communications devices (including the intercom station 460, the pager 1010, the PDA 1012, the on-site, interactive pager 1014, and the mobile phone 1016) to communicate with, and provides the communication and/or associated data to the selected communications devices. As discussed above, the communications interface 440 ensures that the communication, associated data, and/or responses are formatted and/or otherwise configured for each of the selected communications devices. Alternatively, the communication and/or associated data may be routed through firewall 418 to the data network 430 and the gateway 1002 to each of the selected communications devices. An advantage of using the gateway 1002 is that the gateway 1002 may be provided by a manufacturer of the selected communications device for specialized formatting and/or other configuration of the communication and/or associated data for presentation by the selected communications device, such as formatting a picture for display by the liquid crystal display (LCD) screen of the PDA 1012. Still further, as shown in FIG. 11, the communication, associated data, and/or responses of a DCTIC call center 1100 are routed through the telecommunications network 404 (including the public switched telephone network (PSTN) and mobile switched telephone network (MTSO)). An advantage of using the telecommunications network 404 is to leverage the assets of other affiliated data, up-to-date formatting and configuration programs (including sharing the costs of these systems with other customers of the telecommunications network), and increased range of accessing off-site staff (e.g., when a staff member is not located at the school 200, the transmitter 466 and/or alternate communications devices, such as the mobile phone 1018, could provide the means to determine the location, and consequently the status, of the designated party).

Figure 12:
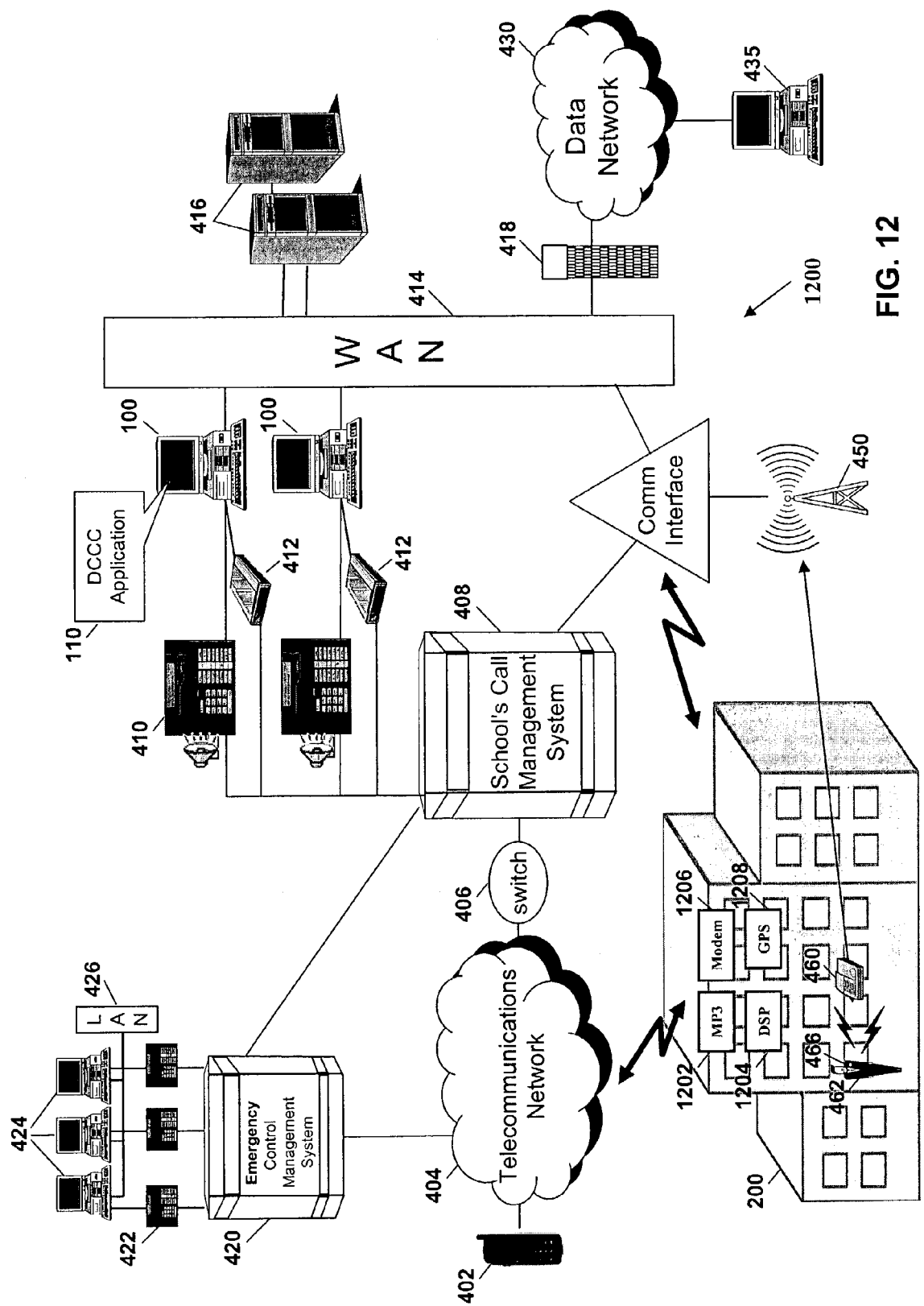
FIG. 12 is a schematic showing an exemplary operating environment for a DCTIC call center system that includes means for determining a status of a designated party and communicating with the designated party through an internal communications interface or a telecommunications network to alternate wireless communications device according to another embodiment of this invention.
Figure 13:
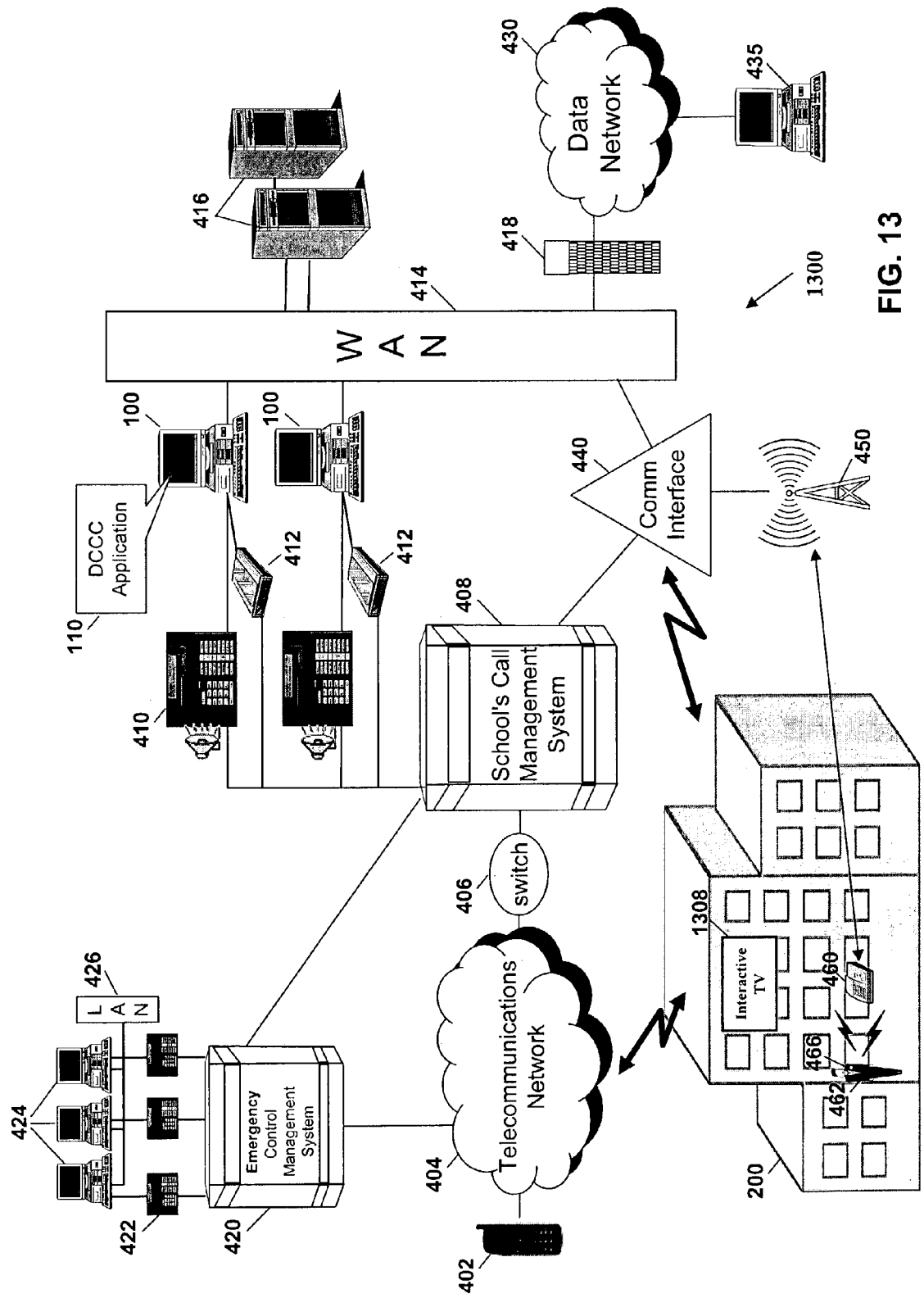
FIG. 13 is a schematic showing another exemplary operating environment with telecommunications and data networks for a DCTIC call center system that includes means for determining a status of a designated party and communicating with the designated party through an internal communications interface or a telecommunications network to another alternate wireless communications device according to an embodiment of this invention.

FIGS. 12 and 13 illustrate a DCTIC call center (DCCC) 1200 similar to the DCCC 400 disclosed in FIG. 4. However, DCCC 1200 further includes a MP3 1202, a digital signal processor 1204, a modem 1206, and a global positioning system (GPS) 1208. According to this embodiment, the agent receives the communication and any associated data at his/her station 100, interacts with the individual to identify the designated party 462, determines the status of the designated party 462 (when status is activated), associates the status with the communications profile to select one or more of the communications devices (including the intercom station 460, the MP3 1202, the digital signal processor 1204, the modem 1206, and the GPS 1208) to communicate with, and provides the communication and/or associated data to selected communications devices. As discussed above, the communications interface 440 and/or the telecommunications network 404 ensures that the communication, associated data, and/or responses are formatted and/or otherwise configured for each of the selected communications devices. Alternatively, the communication, associated data, and/or responses of a DCTIC call center 1200 may be routed through firewall 418 to the data network 430 and a gateway (not shown) to each of the selected communications devices. Still further, according to the embodiment depicted in FIG. 13, a DCTIC call center 1300 includes an interactive television 1308 for communicating the communication, associated data, and/or responses.

Regardless of the communications device used to communicate the communication, associated data, and/or responses, this information may need to be formatted accordingly for the receiving communications device (including audio, text (e.g., ASCII), video, other digital formats, and combination thereof). Accordingly, the DCCC DataServer Application 42 and or affiliated systems (e.g., database, processor, server, etc.) has the intelligence to associate the presentation capabilities of each of the receiving communications devices described in FIGS. 4-13 and to communicate the communication (and associated data and response) to a communications interface (such as communications interface 440 or the gateway 1002) for appropriate formatting. For example, if the alternate communications device uses the Wireless Application Protocol (WAP) technique, then the communication and/ or associated data are formatted using the Wireless Mark-up Language (WML). The Wireless Mark-up Language (WML) and the WAP technique are known and will not be further described. This is a description of a solution for a specific wireless protocol, such as WAP. This solution may be clearly extended to other wireless protocol, such as i-mode, VoiceXML (Voice extensible Markup Language), Dual Tone Multi-Frequency (DTMF), and other signaling means.

Figure 14:
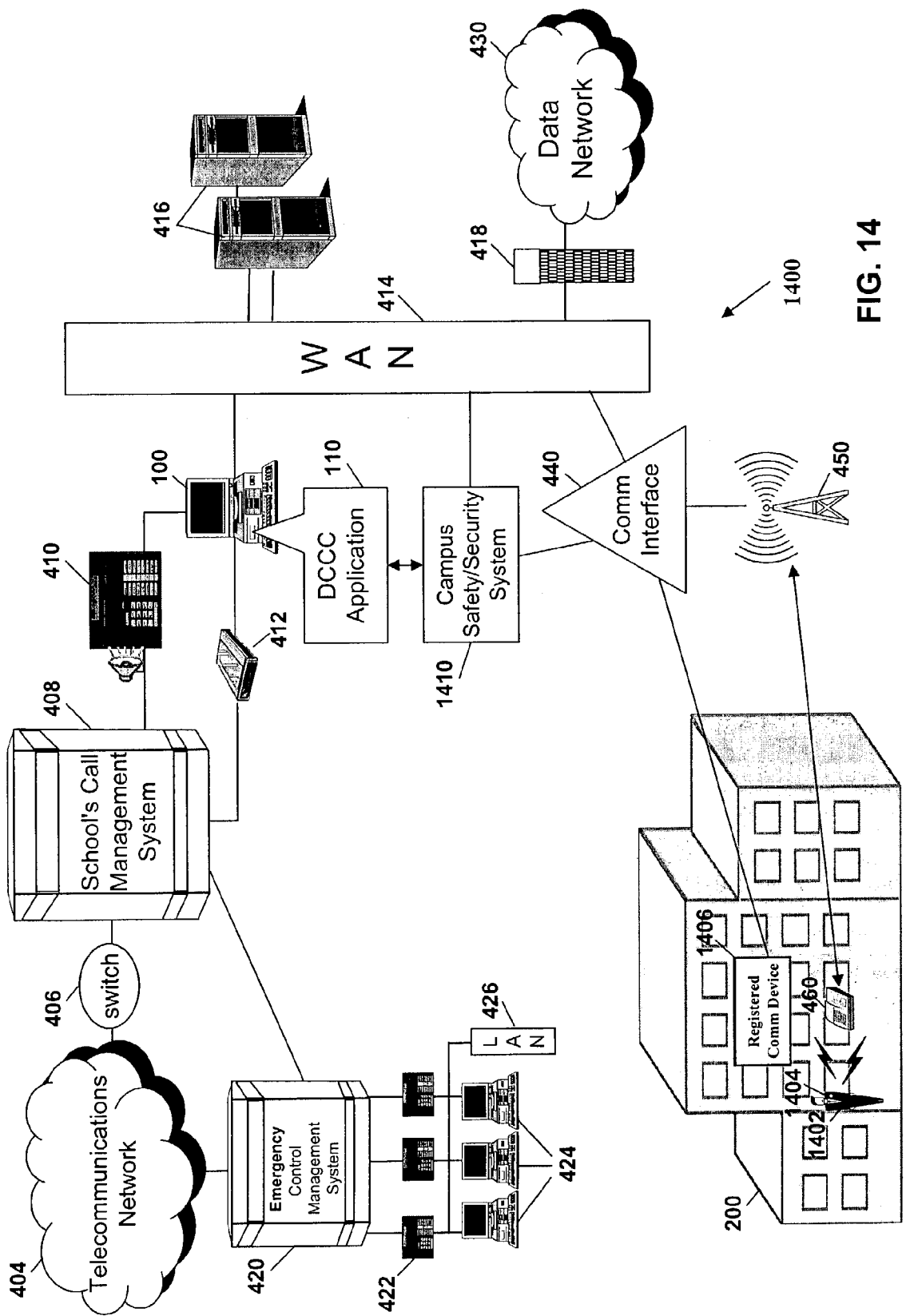
FIG. 14 is a schematic showing another exemplary operating environment of a DCTIC call center system that includes an interface with a campus safety/security system communicating with the designated party according to an embodiment of this invention.

FIG. 14 is a schematic showing an exemplary operating environment for a DCTIC call center (DCCC) 1400 that further includes an interface with a campus safety/security system 1410. The DCCC 1400 has many of the components of FIG. 4 including the telecommunications network 404, the switch 406, the call management system 408, at least one telephone/voice workstation 410, at least one modem 412, at least one agent station 100, the DCTIC call center application 110, the wide area network 414, at least one file server 416, the firewall 418, the emergency control management system (such as 911 control and command centers) 420 including at least one operator telephone/voice workstation 422, at least one operator workstation 424, and the local area network 426, the data network 430, the communications interface 440, the antenna 450, the school 200, the intercom station 460, the designated party 462, the affiliated telephone 464, and the personal identifier transmitter device 466. However, DCCC 1400 further includes a guest 1402 (and/or a student and/or staff), a personal identifier device 1404, a registered communications ("Comm") device 1406 (a communications device, such as a cellular phone, privately-owned by the guest), and the campus security/safety system 1410. The campus safety/security system 1410 provides safety and security services over the intercom 460 (e.g., enables the guest to activate and audio and/or visual recorder proximate to the intercom 460 to record audio and/or visual information, notifies local law enforcement, medical personnel, and/or other emergency response personnel, allows the guest to send a communication within the school's communication system, etc.). The campus safety/security system 1410 further allows the guest 1402 to register with the contact center and create a registration profile similar to the communications profile discussed above. Typically, the registration profile includes information such as a name of the guest 1402, contact information, one or more registered communications devices 1406, personal identifier device 1404 associated with guest 1402, and/or schedule information. The registration profile and/or the communications profile may be used to route a communication to and/or determine a status of the registered communications device 1406 with the school call management system so that communications and associated data can be communicated to the registered communications device 1406. This invention allows the guest 1402 to use the campus safety/security system 1410 to register for DCCC services by providing a list of communications devices affiliated with a guest (so that the DCCC application can format and/or otherwise configure incoming communications and/or associated data for the communications device), routing addresses of the registered communications device 1406 such as radio frequency identifiers, service node addresses (e.g., telephone numbers), IP addresses, email addresses, and/or other electronic address information, and times, dates, and/or other schedules for availability of each registered communications device 1406 (e.g., Type of communications device: cellular phone, Address: 504-596-3807, When Available to Answer Phone: 9 AM-5 PM). Once the guest provides a registered communications device 1406 (such as telephone pager 1010, personal digital assistant (PDA) 1012, interactive pager 1014, and mobile phone 1016 shown in FIG. 10 and MP3 1102, digital signal processor 1104, modem 1106, and GPS 1108 shown in FIG. 11), the DCCC 1400 can communicate communications (and associated data) through communications interface 440 similar to the above embodiments. Alternatively, the guest 1402 may participate in the DCCC 1400 by using a personal identifier device 1404 that transmits signals either to the nearby intercom station 460 or to the transmitter 245. Once the guest elects to participate using the personal identifier device 1404, the DCCC application 110 associates the guest 1402 (including the communications profile and information associated with the guest and stored in the campus safety/security system 1410) with the transmitted signals that are used to locate the guest 1402 and provide availability data and/or location data of the guest 1402. Similar to the availability data and/or location data of the designated party 462, the availability data and/or location data of the guest 1402 are used to determine the status of the guest 1402. In addition, the personal identifier device 1404 may further include an ON/OFF switch that enables or disables the personal identifier device 1404 from transmitting signals. For example, if the guest 1402 turned the switch OFF, then personal identifier device 1404 would not transmit signals and the guest 1402 could not be located by the personal identifier device 1404.

Figure 15:
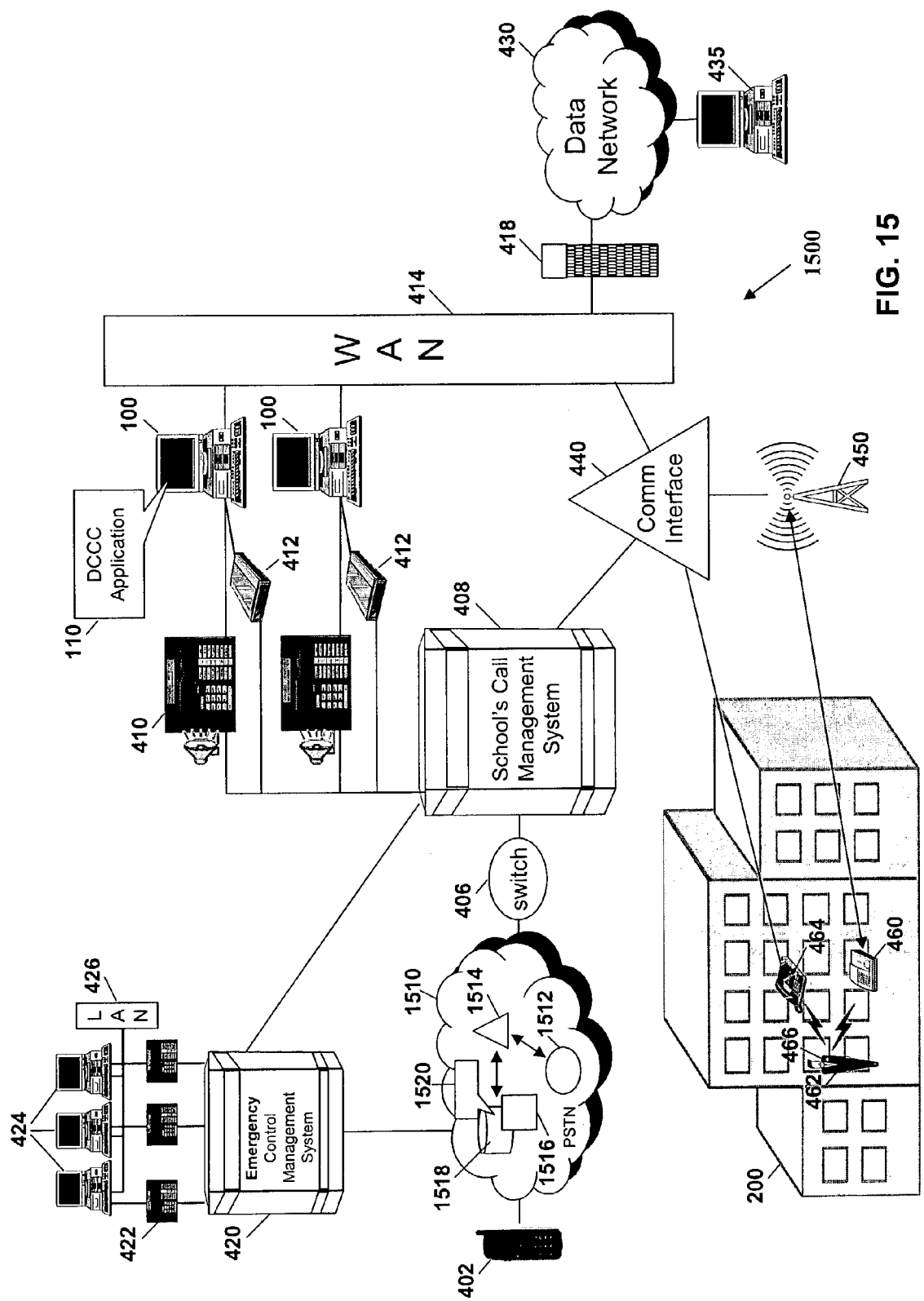
FIG. 15 is a schematic of an exemplary operating environment of a DCTIC call center system interfacing with a telecommunications network to according to another embodiment of this invention.

FIG. 15 illustrates a DCTIC call center (DCCC) 1500 similar to DCCC 400; however, DCCC 1500 leverages the assets of a telecommunications network provided by PSTN 1510. The PSTN 1510 includes a service switching point (SSP) 1512, a service control point (SCP) 1514, and a DCCC Rule-Based Application DataServer 1516 including a database 1518 of at least one communications profile 1520. The DCCC Rule-Based Application DataServer 1516 functions similar to the DCCC DataServer Application 42 described above; however, the DataServer 1516 is provided by a local telecommunications provider and leverage the assets of the provider's network including off-site data storage and high-speed data transmission capabilities. Typically, the agent uses the station 100 and DCCC application 110 to gain access to the PSTN 1510 to use the DCCC Rule-Based Application DataServer 1516. The switch 406 allows a connected station 100 to communicate the communications and/or associated data including a request for remote and/or linked data associated with the communications profile 1520 via the PSTN 1510 to a telecommunications facility, such as, for example, a central office (CO), a mobile telephone switching office (MTSO), and/or a combination CO/MTSO. The PSTN 1510 may use any means of coupling the switch 406, but the coupling means is preferably high-capacity, high-bandwidth optical transport services, Gigabit Ethernet services, and/or the like. As those of ordinary skill in the art of telecommunications understand, the PSTN 1510 could also link each switch 406 via other appropriate means, such as, for example a Synchronous Optical Network (SONET) structure with redundant, multiple rings.

The means of coupling the DCCC 1500, the designated party 462, the PSTN 1510, the WAN 414, the data network 430, and the phone 402 may include a variety of means, including optical transmission of electronic data, wireless transmission of electronic data, and/or fixed-wire transmission of electronic data (e.g., via a local loop of a telecommunications network to communicate electronic data). Fiber optic technologies, spectrum multiplexing (such as Dense Wave Division Multiplexing), Ethernet and Gigabit Ethernet services, and Digital Subscriber Lines (DSL) are just some examples of the coupling means. For example, the DCCC 1500 may utilize SmartRing, AVVID & Frame Relay, and SS7 VC interconnections. Accordingly, the PSTN 1510 may include Advanced Intelligent Network (AIN) componentry that may be programmed to control features of the DCCC 1500, such as locating a designated party 462 off-site and adding the off-site designated party 462 to a group conference of the communication, associated data, and/or responses (e.g., a mobile phone of the designated party could be located using fingerprinting or other techniques in the art, this location could be associated with a status, and the agent could process the communication according to the status). The signaling between the DCCC 1500, the designated party 462, the PSTN 1510 including AIN componentry, the WAN 414, the data network 430, and the phone 402 are well understood in by those of ordinary skill the art and will not be further described. Further, those of ordinary skill in the art will be able to apply the principles of this invention to their own communications systems including their network configurations which may differ substantially from those illustrated in the figures.

The DCTIC call center (shown as reference numerals 400-1500 in FIGS. 4-15) is a system that may be used to enhance safety and security of the school. For example, the DCTIC call center works with the school communications system to provide safety officials with the tools required to deter, track, identify, and prosecute individuals that make bomb threats and other threatening calls to the administrators, teachers, staff, guests, and/or students. The agent may use the safety/security requirements agent of the DCCC application 100 and/or a communications profile of the DCCC application 100 to (1) initiate communication recording and record the entire call, not just the part of the call after the recording process has begun, (2) deactivate privacy features of the incoming call in order to match calling number source data (e.g., name of person financially responsible for paying telephone bill of the telephone used to place the call), (3) match calling number data with location data to determine a location of the communication and/or use communication signals of the communication device to determine a location, (4) provide near real-time or real-time notification to safety and security personnel, including local law enforcement, medical personnel, and other response personnel, (5) transfer the call to the designated party without having to look additional information (e.g., uses the dissemination instructions and/or other information in the communications profile and provides a "one-click" link to transfer the communication).

Figure 16:
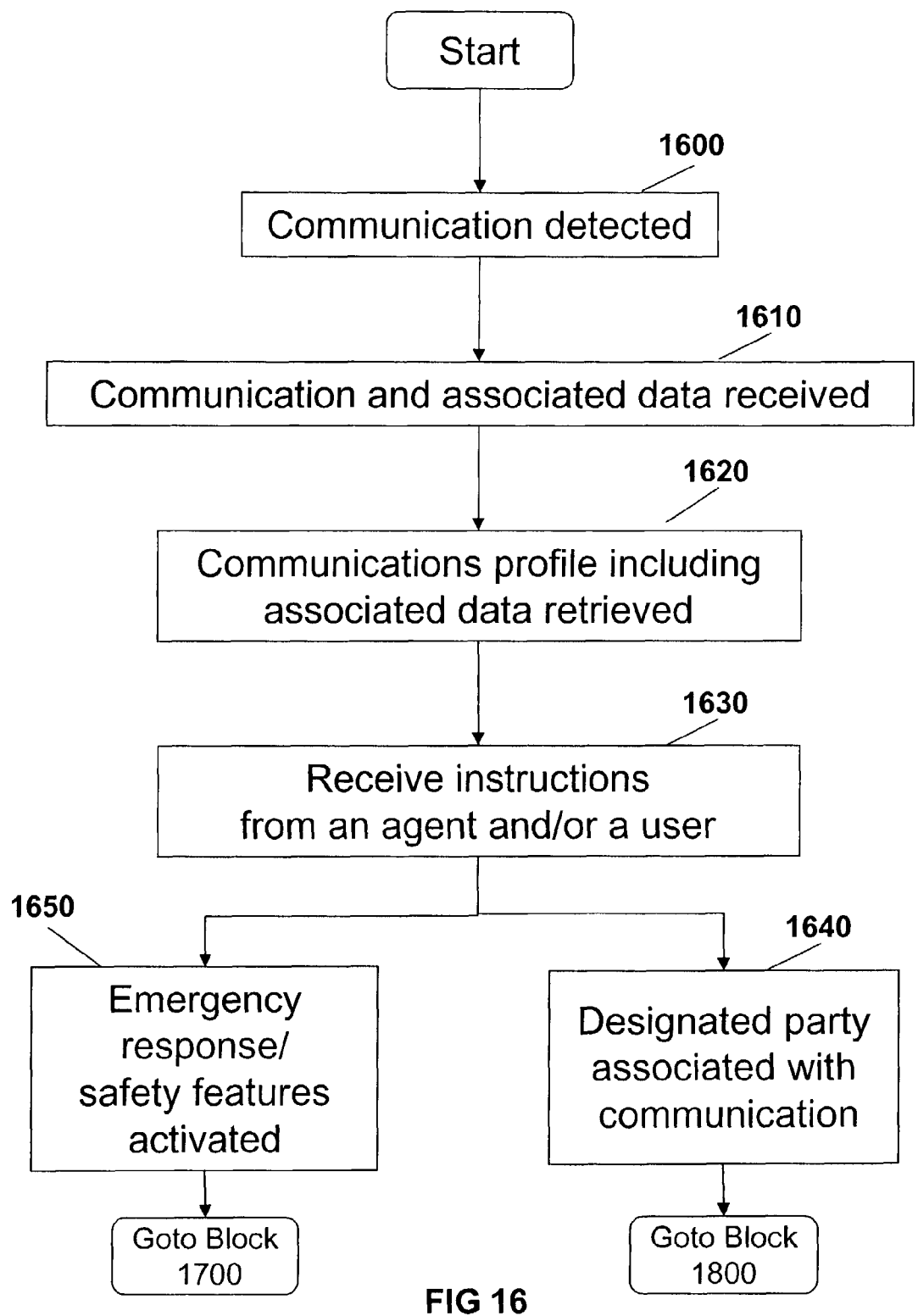
FIGS. 16-18 are flowcharts of a communications method for a school call center according to an embodiment of this invention.
Figure 17:
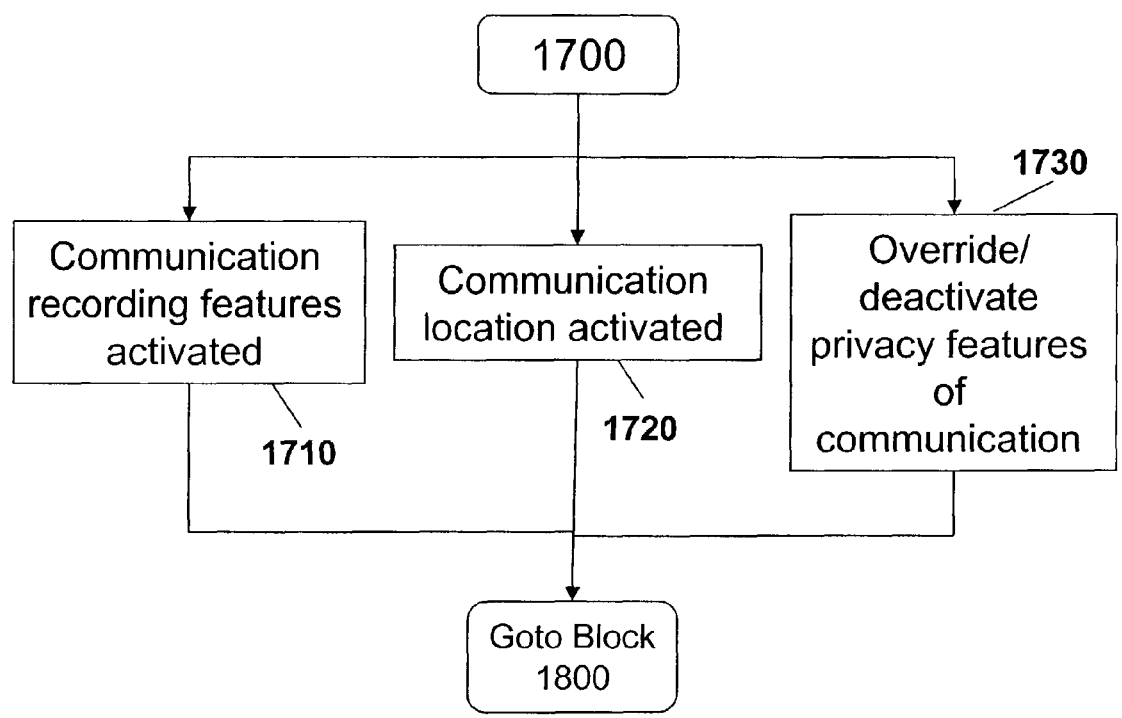
Figure 18:
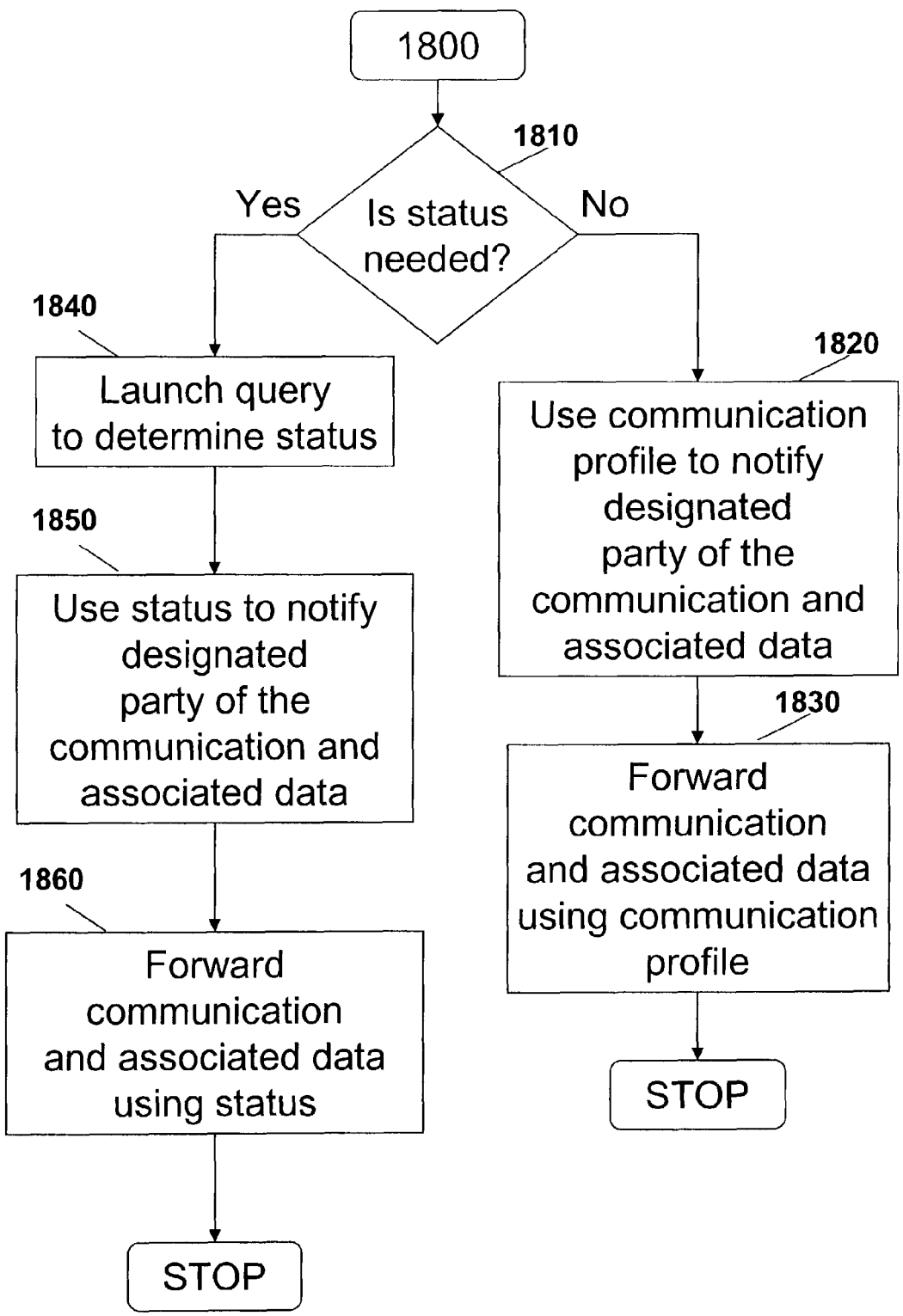

Referring now to FIGS. 16-18, an overview of a process of providing DCTIC call center services is illustrated according to an embodiment of this invention. While some of the processes in FIGS. 16-18 are shown in series, these processes may occur in different orders and/or at simultaneous times as one of ordinary skill in the art will understand.

Referring now to FIG. 16, a school call management system detects an incoming communication (block 1600). Typically, the incoming communication is decoded (not shown) and associated data is transmitted with the communication to the school call management system. The school call management system receives the communication and associated data (block 1610). Next, a communications profile is associated with the communication (either automatically using the associated data or manually by an agent) (block 1620). The communications profile includes information, such as (1) calling number source data associated with the communication, (2) location data associated with the communication, (3) communication recording data services, (4) dissemination instructions for at least one of the communication and the data to a communications device of a designated party, the designated party comprising at least one of a staff member, a student, a guest associated with the school call center, (5) data associated with the designated party, (6) data associated with the school call center, and (7) data associated with the communications device. Thereafter, the agent (or a user if this is an automated response system or if an individual is accessing the campus safety/security system 1410 via intercom 460) inputs instructions for processing the communication and/or associated data (block 1630). If the agent initiates emergency response and/or safety features, then the method continues with block 1650. If, however, the agent does not initiate emergency response and/or safety features, then the method continues with block 1640 that associates a designated party with the communication and that continues with block 1800 of FIG. 18.

If the emergency response and/or safety features of block 1650 are activated, then the method continues with block 1700 of FIG. 17. Thereafter, the DCCC may (1) initiate communication recording including audio, visual, text, and/or other digital recording (block 1710), (2) match calling number data with location data to determine a location of the communication and/or use communication signals of the communication device to determine a location (block 1720), and (3) deactivate privacy features of the communication in order to track the communication (block 1730). Thereafter the method continues with block 1800 of FIG. 18.

The method continues with block 1800 of FIG. 18. A decision is made whether to launch a status inquiry or not (block 1810). If the decision is no, then the communication profile is used to notify the designated party of the communication and/or associated data (block 1820) and to forward the communication and/or associated data (block 1830). If a status inquiry is needed (block 1810), then the status inquiry is launched (block 1840) and a status is determined (not shown). Thereafter, the results of the status are used to notify the designated party of the communication and/or associated data (block 1850) and to forward the communication and/or associated data (block 1860). Regardless of whether the status is used or not, the DCCC method provides near real-time or real-time notification to safety and security personnel, including local law enforcement, medical personnel, and other response personnel, and the DCCC enables the transfer of the communication and/or associated data to the designated party without having to lookup or access additional information (e.g., uses the dissemination instructions and/or other information in the communications profile and provides a "one-click" link to transfer the communication). Further, the method may include a decision to request confirmation that the designated party has received and/or reviewed the communication and/or associated data (e.g., a message) and may include receipt of the confirmation (not shown).

While several exemplary implementations of embodiments of this invention are described herein, various modifications and alternate embodiments will occur to those of ordinary skill in the art. For example, the DCCC may include wired, optical, and/or wireless components and/or other components (not shown). The DCCC may use any means of coupling each of the electronic components for communicating the communication and/or associated data, but the coupling means is preferably high-capacity, high-bandwidth optical transport services, Gigabit Ethernet services, and/or the like. As those of ordinary skill in the art of computer telephony integration understand, the electronic components could also be coupled using other appropriate means, such as, for example a Synchronous Optical Network (SONET) structure with redundant, multiple rings. Copper conductors may also be used. Accordingly, this invention is intended to include those other variations, modifications, and alternate embodiments that adhere to the spirit and scope of this invention.

What is claimed is:

1. A computer telephony integration system having a call management system for connecting at least one agent station with at least one telephone line, the system comprising:
   a processor executing a software application stored in memory that causes the processor to:
   receive a communication at an automated answering system in a school's call center;
   receive calling number identification information associated with the communication;
   automatically inquire for an identifier of a caller;
   receive initiation of an emergency response feature;
   retrieve a profile associated with the calling number identification information;
   provide the communication and the calling number identification information to a computer in the school's call center;
   allow the computer to select a memory location at the school's call center for storing the calling number identification information;
   store the calling number identification information to a local file server operating in the school's call center;
   identify a designated party to receive the communication;
   associate a communications profile with the designated party;
   retrieve an Internet Protocol address from the communications profile;
   receive a location of the designated party and a location of a device associated with the Internet Protocol address, wherein the location of the designated party and the device associated with the Internet Protocol address is determined based on mapping coordinates to associate a location within a school, wherein the coordinates are transmitted by the device associated with the Internet Protocol address;
   determine a communications device is proximate to the location of the device associated with the Internet Protocol address;
   retrieve a rule that specifies an availability of the designated party to accept the communication based on the location of the designated party;
   retrieve another rule that requires routing the communication to the communications device when the designated party is unavailable; and
   route the communication to the communications device.

2. The system of claim 1, wherein the software application further causes the processor to store and retrieve the communications profile, the communications profile comprising data associated with the communication.

3. The system of claim 1, wherein the software application further causes the processor to receive signals that determine a location of the communications device.

4. A method, comprising:
   receiving a call at an automated answering system in a school's call center;
   receiving calling number identification information associated with the call;
   automatically inquiring for an identifier of a caller;
   receiving initiation of an emergency response feature;
   retrieving a profile associated with the calling number identification information;
   retrieving from the profile an instruction to record the call;
   routing the call and the calling number identification information to a computer in the school's call center;
   allowing a user of the computer to select a memory location at the school's call center for storing the calling number identification information;
   storing the calling number identification information to a local file server operating in the school's call center;
   identifying a designated party to receive the call;
   associating a communications profile with the designated party;
   retrieving an Internet Protocol address from the communications profile;
   retrieving instructions from the communications profile for disseminating the calling number identification information to the Internet Protocol address associated with the designated party;
   sending, according to the instructions, the calling number identification information to the Internet Protocol address associated with the designated party;
   receiving a location of the designated party;
   receiving a location of a device associated with the Internet Protocol address, wherein the location of the designated party and the device associated with the Internet Protocol address is determined based on mapping coordinates to associate a location within a school, wherein the coordinates are transmitted by the device associated with the Internet Protocol address;
   retrieving a rule from memory that specifies an availability of the designated party to accept the call based on the location of the designated party;
   retrieving another rule that requires routing the call to a messaging system proximate to the location of the device associated with the Internet Protocol address when the designated party is unavailable; and
   routing the call to the messaging system.

5. The method of claim 4, further comprising:
   presenting a message that the call may be recorded; and
   presenting another message that the privacy features of the call are deactivated.

6. The method of claim 4, further comprising encrypting the calling number identification information.

7. A computer readable storage device storing processor executable instructions for performing a method, the method comprising:
   receiving a call at an automated answering system in a school's call center;
   receiving a calling number identification information associated with the call;
   automatically inquiring for an identifier of a caller;
   receiving initiation of an emergency response feature;
   retrieving a profile associated with the calling number identification information;
   retrieving from the profile an instruction to record the call;
   determining a location associated with the communication by matching the calling number identification information with profile location data retrieved from the profile;
   routing the call and the calling number identification information to a computer in the school's call center;
   allowing a user of the computer to select a memory location at the school's call center for storing the calling number identification information;
   storing the calling number identification information to a local file server operating in the school's call center;
   identifying a designated party to receive the call;
   associating a communications profile with the designated party;
   retrieving an Internet Protocol address from the communications profile;

retrieving instructions from the communications profile for disseminating the calling number identification information to the Internet Protocol address associated with the designated party;

sending, according to the instructions, the calling number identification information to the Internet Protocol address associated with the designated party;

receiving a location of the designated party;

receiving a location of a device associated with the Internet Protocol address, wherein the location of the designated party and the device associated with the Internet Protocol address is determined based on mapping coordinates to associate a location within a school, wherein the coordinates are transmitted by the device associated with the Internet Protocol address;

retrieving a rule from the communications profile that specifies an availability of the designated party to accept the call when based on the location of the designated party;

retrieving another rule from the communications profile that requires the call be routed to a messaging system proximate to the location of the device associated with the Internet Protocol address when the designated party is unavailable; and routing the call to the messaging system.

* * * * *